(12) United States Patent
Tabata et al.

(10) Patent No.: US 12,033,443 B2
(45) Date of Patent: Jul. 9, 2024

(54) ABNORMALITY CAUSE DETERMINING DEVICE, VEHICULAR CONTROL DEVICE, AND VEHICULAR CONTROL SYSTEM

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Ken Imamura, Toyota (JP); Shinichi Ito, Anjyo (JP); Kota Fujii, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 561 days.

(21) Appl. No.: 17/346,863

(22) Filed: Jun. 14, 2021

(65) Prior Publication Data
US 2021/0390801 A1    Dec. 16, 2021

(30) Foreign Application Priority Data
Jun. 16, 2020  (JP) .................................. 2020-103626

(51) Int. Cl.
| *F16H 61/12* | (2010.01) |
| *F16H 61/02* | (2006.01) |
| *G07C 5/08* | (2006.01) |

(52) U.S. Cl.
CPC ....... *G07C 5/0808* (2013.01); *F16H 61/0204* (2013.01); *F16H 61/12* (2013.01); *G07C 5/0816* (2013.01); *F16H 2061/1216* (2013.01); *F16H 2061/1288* (2013.01)

(58) Field of Classification Search
CPC ................. F16H 61/12; F16H 61/0204; F16H 2061/1216; F16H 2061/1288; G07C 5/0808; G07C 5/0816
See application file for complete search history.

(56) References Cited

U.S. PATENT DOCUMENTS

2014/0195996 A1*  7/2014  Bose ..................... G06F 30/392
                                              716/120

FOREIGN PATENT DOCUMENTS

| JP | 2013170625 A | * | 9/2013 |
| JP | 2016-219569 A | | 12/2016 |
| WO | 2020/031677 A1 | | 2/2020 |
| WO | WO-2020031677 A1 | * | 2/2020 |

* cited by examiner

*Primary Examiner* — Edwin A Young
(74) *Attorney, Agent, or Firm* — Oliff PLC

(57) ABSTRACT

An abnormality cause determining device that is applied to a vehicle including an electromagnetic actuator includes a storage device and an execution device. The storage device is configured to store map data which is data for defining a map. The map includes a current variable which is a variable indicating a current flowing actually in the electromagnetic actuator as an input variable and includes a cause variable which is a variable indicating a cause of an abnormality of an onboard unit including the electromagnetic actuator as an output variable. The execution device is configured to perform an acquisition process of acquiring a value of the input variable based on a detection value from a sensor which is mounted in the vehicle and a calculation process of calculating a value of the output variable by inputting the value of the input variable to the map.

20 Claims, 12 Drawing Sheets

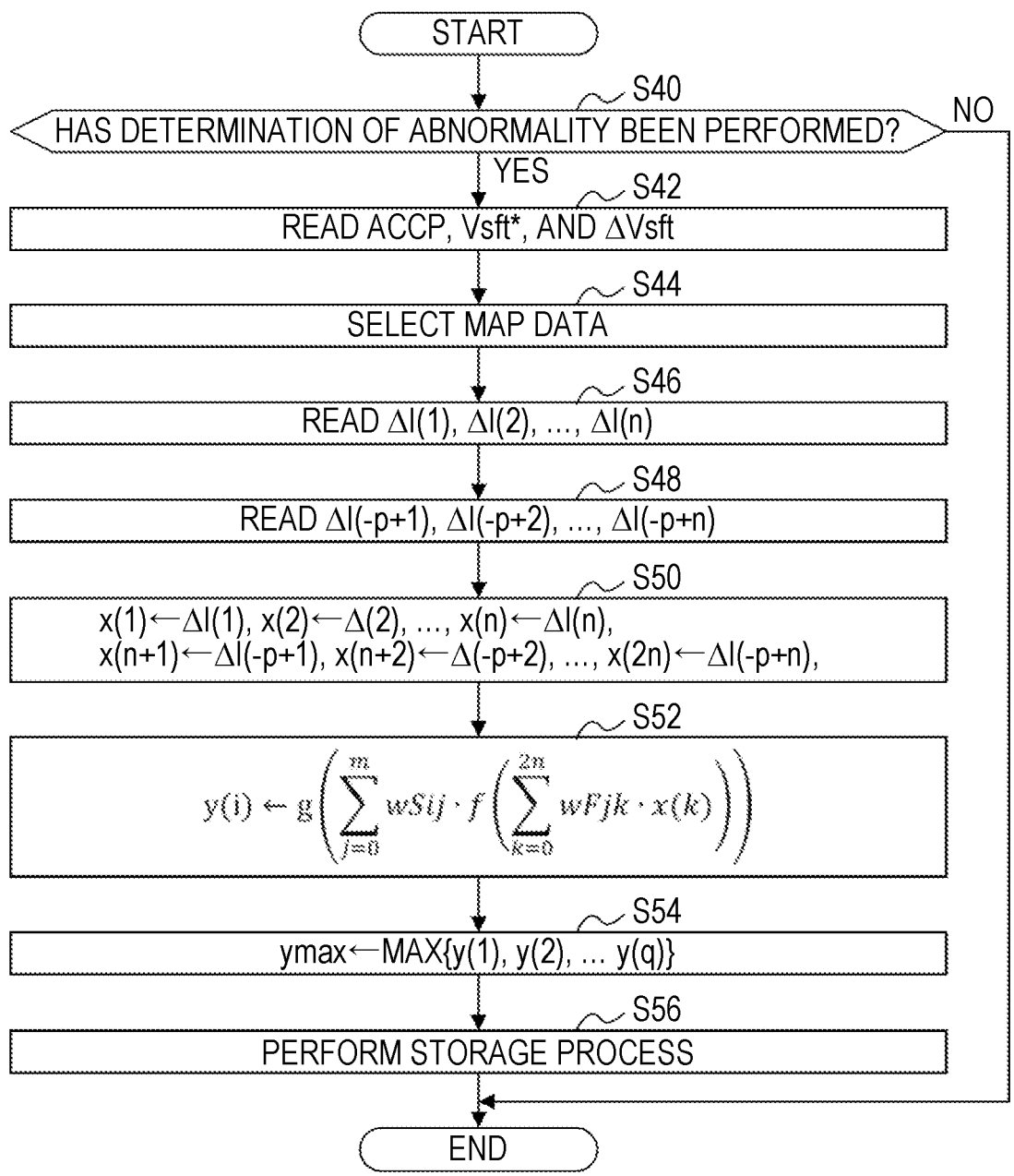

FIG. 7

| y(1) | MIXING OF AIR |
|------|----------------|
| y(2) | TEMPORARY STICK |
| y(3) | FULL STICK |
| ⋮ | ⋮ |

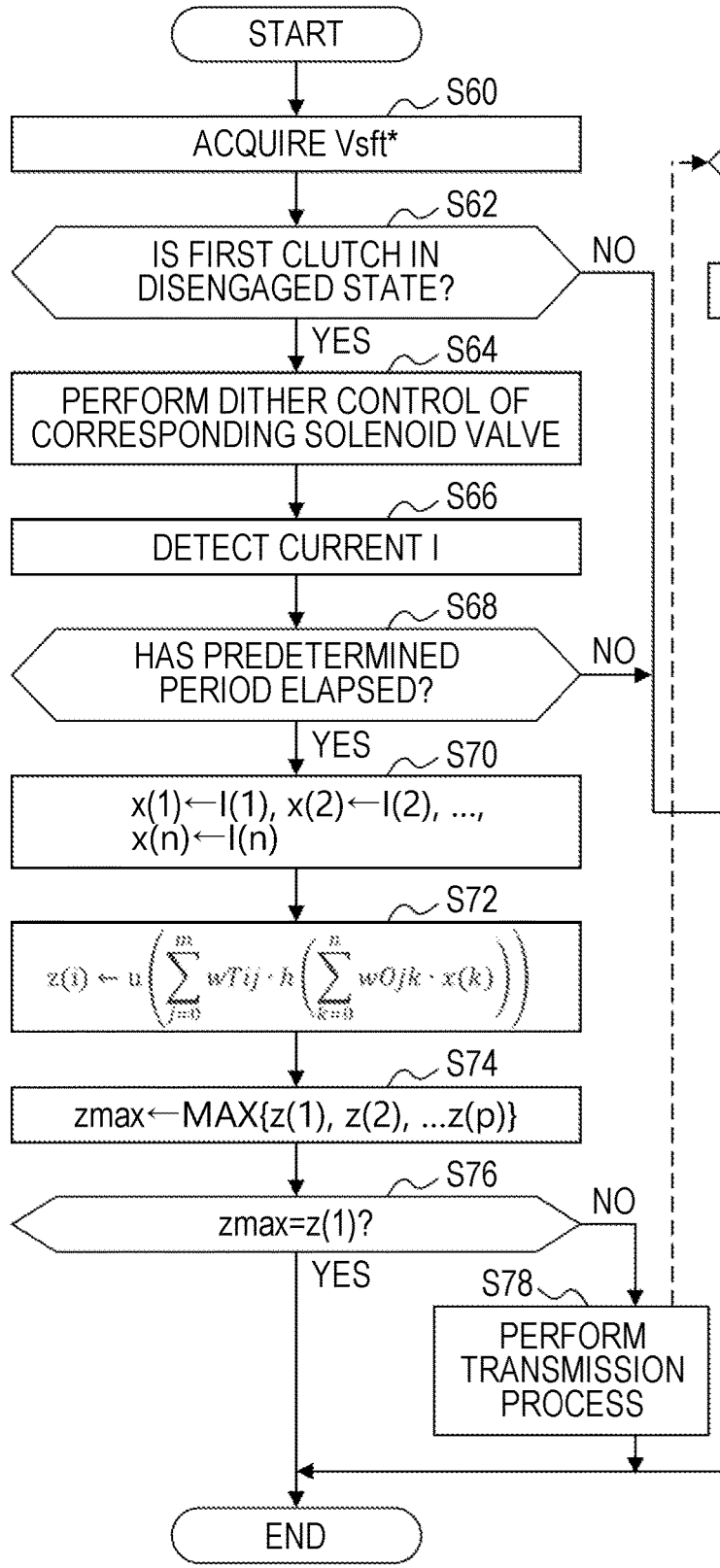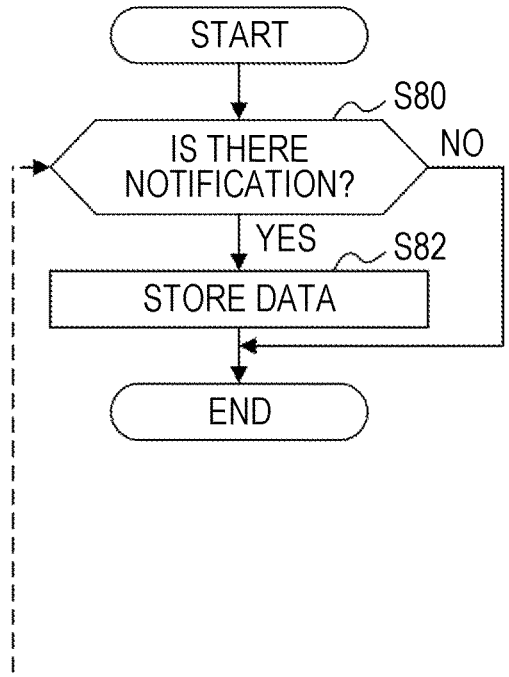
FIG. 9A
FIG. 9B

FIG. 10

| z(1) | NORMAL |
| --- | --- |
| z(2) | MIXING OF AIR |
| z(3) | TEMPORARY STICK |
| ⋮ | ⋮ |

ABNORMALITY CAUSE DETERMINING DEVICE, VEHICULAR CONTROL DEVICE, AND VEHICULAR CONTROL SYSTEM

CROSS-REFERENCE TO RELATED APPLICATION

This application claims priority to Japanese Patent Application No. 2020-103626 filed on Jun. 16, 2020, incorporated herein by reference in its entirety.

BACKGROUND

1. Technical Field

The disclosure relates to an abnormality cause determining device, a vehicular control device, and a vehicular control system.

2. Description of Related Art

For example, Japanese Unexamined Patent Application Publication No. 2016-219569 (JP 2016-219569 A) discloses a device that determines whether an abnormality has occurred in a linear solenoid based on a current flowing in the linear solenoid.

SUMMARY

When an abnormality has occurred in a linear solenoid, a linear solenoid drive device needs to be disassembled to identify details of a position at which the abnormality has occurred.

The disclosure provides an abnormality cause determining device, a vehicular control device, and a vehicular control system that can identify details of a position at which an abnormality has occurred when an abnormality has occurred in an onboard unit including an electromagnetic actuator. An abnormality cause determining device according to a first aspect of the disclosure is applied to a vehicle including an electromagnetic actuator and includes a storage device and an execution device. The storage device is configured to store map data which is data for defining a map. The map includes a current variable which is a variable indicating a current actually flowing in the electromagnetic actuator as an input variable and includes a cause variable which is a variable indicating a cause of an abnormality of an onboard unit of the vehicle, including the electromagnetic actuator, as an output variable. The execution device is configured to perform an acquisition process of acquiring a value of the input variable based on a detection value from a sensor which is mounted in the vehicle and a calculation process of calculating a value of the output variable by inputting the value of the input variable to the map.

When an abnormality occurs in an onboard component including an electromagnetic actuator, the behavior of a current actually flowing in the electromagnetic actuator is likely to be affected. The behavior of the current is likely to vary depending on different causes of abnormality in the onboard component. With the abnormality cause determining device according to the first aspect, the value of the cause variable is calculated using a map including the current variable as an input variable and including the cause variable as an output variable in consideration of the aforementioned points. Accordingly, it is possible to identify a detailed position at which an abnormality has occurred.

In the abnormality cause determining device according to the first aspect, the onboard unit may be a gear shifting device that changes a gear shift ratio between a rotation speed of a rotation shaft of a rotary machine which is mounted in the vehicle and a rotation speed of driving wheels. The electromagnetic actuator may include a solenoid valve of the gear shifting device. The current variable which is the input variable may include a variable indicating a current flowing in the solenoid valve in a switching period of the gear shift ratio in the gear shifting device.

The current flowing in the solenoid valve in the switching period of the gear shift ratio depends on the operation of the solenoid valve. Accordingly, with the abnormality cause determining device having this configuration, it is possible to identify details of an abnormality position by including a variable indicating the current flowing in the solenoid valve as the input variable to the map.

In the abnormality cause determining device having the aforementioned configuration, the current variable may include a variable indicating a difference between the detection value of the current flowing in the solenoid valve in the switching period and a current command value. When a command value for the current flowing in the solenoid valve changes, the behavior of the current flowing in the solenoid valve becomes different from that before the change due to the change of the current command value. On the other hand, with the abnormality cause determining device having the aforementioned configuration, it is possible to curb a change in value of the current variable due to the change of the current command value by using a variable indicating a difference as the current variable.

In the abnormality cause determining device having the aforementioned configuration, the storage device may be configured to store a plurality of pieces of map data which differs depending on a switching type of the gear shift ratio. The calculation process may include a selection process of selecting the map data corresponding to switching of the gear shift ratio in a sampling period of the current variable which is the input variable out of the plurality of pieces of map data as the map data defining the map for calculating the value of the output variable.

Since appropriate gear shift control varies depending on the gear shift ratio, the behavior of the current can also vary depending on the gear shift ratio. With the abnormality cause determining device having the aforementioned configuration, when a single map is used regardless of the type of shift of the gear shift ratio, the demands with regard to the map are high. Therefore, with the abnormality cause determining device having the aforementioned configuration, by preparing map data which differs depending on the types of shift of the gear shift ratio and calculating the value of the output variable using the corresponding map data, it is possible to perform accurate learning with a small number of pieces of training data which are used for learning of the respective maps, to accurately calculate the value of the output variable with a small number of dimensions of the input variable, and to accurately calculate the value of the output variable with a simple structure.

In the abnormality cause determining device having the aforementioned configuration, the storage device may be configured to store a plurality of pieces of map data which differs depending on a torque variable which is a variable indicating a torque applied to the driving wheels. The acquisition process may include a process of acquiring a value of the torque variable. The calculation process may include a selection process of selecting the map data corresponding to the value of the torque variable acquired through the acquisition process out of the plurality of pieces of map data as the map data defining the map for calculating the value of the output variable.

Since a torque applied to the gear shifting device varies depending on the torque applied to the driving wheels, appropriate gear shift control varies. Accordingly, the behavior of the current is likely to vary depending on the torque. Accordingly, when a single map is used regardless of the torque, the demands with regard to the map are high. Therefore, with the abnormality cause determining device having the aforementioned configuration, by preparing map data which differs depending on the torque and calculating the value of the output variable using the corresponding map data, it is possible to perform accurate learning with the small number of pieces of training data which are used for learning of the respective maps, to accurately calculate the value of the output variable with a small number of dimensions of the input variable, or to accurately calculate the value of the output variable with a simple structure.

In the abnormality cause determining device having the aforementioned configuration, the current variable which is the input variable simultaneously input to the map may include a variable indicating a current having flowed in the solenoid valve when the same switch was performed in the past in addition to the variable indicating the current flowing in the solenoid valve in a present switching period of the gear shift ratio in the gear shifting device.

With the abnormality cause determining device having this configuration, it is possible to calculate the value of the cause variable in consideration of a history or trends in the behavior of the current by including a variable indicating the current flowing in the solenoid valve when the same switching was performed in the past as the input variable.

In the abnormality cause determining device having the aforementioned configuration, the cause variable may include a decrease in controllability of the solenoid valve due to bubbles included in a hydraulic fluid of the gear shifting device, a temporary stick abnormality which is an abnormality temporarily occurring in an operation of the solenoid valve due to temporary mixing of foreign matter into the solenoid valve, and a regular stick abnormality which is an abnormality occurring regularly in the operation of the solenoid valve due to mixing of foreign matter into the solenoid valve.

The behaviors of the currents flowing in the solenoid valve in the three abnormalities are likely to exhibit great differences. Accordingly, with the abnormality cause determining device having the aforementioned configuration, it is possible to accurately determine to which one of the three abnormalities an abnormality corresponds based on the value of the current variable.

A vehicular control device according to a second aspect of the disclosure includes the abnormality cause determining device. The execution device is configured to perform an abnormality determining process, an alarming process, and an acquisition process. The abnormality determining process includes a process of determining that an abnormality has occurred in the gear shifting device when a degree of separation between a rotation speed of an input shaft of the gear shifting device in a period in which the gear shift ratio is switched and a reference rotation speed is equal to or greater than a predetermined value. The alarming process includes a process of issuing an alarm indicating that an abnormality has occurred. The acquisition process includes a process of acquiring the value of the input variable in a period in which the gear shift ratio is switched when it is determined through the abnormality determining process that an abnormality has occurred.

With the vehicular control device according to the second aspect, by calculating the value of the cause variable based on the value of the input variable when it has been determined in the abnormality determining process that an abnormality has occurred, it is possible to specifically determine the cause of the abnormality determined in the abnormality determining process.

In the vehicular control device according to the second aspect, the execution device may be configured to perform a storage process of storing a calculation result of the calculation process in the storage device. With the vehicular control device having the aforementioned configuration, since the calculation result is stored in the storage device, an entity that determines what treatment to perform on the vehicle can determine the treatment based on the calculation result stored in the storage device, for example, when a user having been notified of an alarm drives the vehicle to a repair shop.

A vehicular control device according to a third aspect of the disclosure includes the abnormality cause determining device. The onboard unit is a gear shifting device that changes a gear shift ratio between a rotation speed of a rotation shaft of a rotary machine mounted in the vehicle and a rotation speed of driving wheels. The electromagnetic actuator includes a solenoid valve, the map is a first map, the map data is first map data, the acquisition process is a first acquisition process, and the calculation process is a first calculation process. The execution device is configured to perform a dither control process of causing a current to flow in the solenoid valve such that the solenoid valve for switching a frictional engagement element which is disengaged when the gear shift ratio is not switching between disengagement and engagement vibrates in a range in which the frictional engagement element is not engaged. The storage device is configured to store second map data for defining a second map including the current variable when the dither control process is performed as an input variable and including an abnormality variable which is a variable indicating whether an abnormality has occurred in the solenoid valve as an output variable. The execution device is configured to perform a second acquisition process and a second calculation process. The second acquisition process includes a process of acquiring a value of the current variable when the dither control process is performed. The second calculation process includes a process of calculating a value of the output variable by inputting the value of the current variable acquired in the second acquisition process to the second map.

With the vehicular control device according to the third aspect, a value of the abnormality variable indicating whether an abnormality has occurred in the solenoid valve is calculated based on the current flowing in the solenoid valve that drives a frictional engagement element in the disengaged state. Accordingly, it is possible to determine whether there is an abnormality before an abnormality has occurred in gear shift control.

In the vehicular control device according to the third aspect, the execution device may be configured to perform a notification process of notifying a calculation result of the second calculation process to an outside of the vehicle. With the vehicular control device having the aforementioned configuration, by notifying the outside of the vehicle of the calculation result in the second calculation process, it is possible to notify the outside of the vehicle of information on a symptom of an abnormality or the like before an abnormality is detected in actual gear shift control in the vehicle.

A vehicular control system according to a fourth aspect of the disclosure includes the vehicular control device. The execution device includes a first execution device that is provided in the vehicle and a second execution device that is not provided in the vehicle. The first execution device may be configured to perform a data transmission process of transmitting data based on a detection value from the sensor associated with a current flowing actually in the electromagnetic actuator. The second execution device may be configured to perform a data receiving process of receiving data transmitted in the data transmitting process and the calculation process.

With the vehicular control system according to the fourth aspect, since the second execution device outside the vehicle performs the calculation process, it is possible to further decrease a calculation load of the first execution device in comparison with a case in which the first execution device performs the calculation process. In the vehicular control system according to the fourth aspect, the second execution device may be configured to perform the calculation process based on values of the current variables of a plurality of vehicles. The second execution device may be configured to perform a feedback process and an update process. The feedback process may be a process of acquiring information indicating that the value of the output variable of the calculation process is not valid. The update process may be a process of updating the map data when information indicating that the value of the output variable is not valid is acquired in the feedback process.

With the vehicular control system having this configuration, when the value of the output variable associated with each of a plurality of vehicles is not valid, the map data is updated. Accordingly, in comparison with a case in which only the value of the output variable of a single vehicle is handled, an amount of data for update can be readily increased and the map data can be used as data for accurately calculating the value of the output variable in actual traveling of the vehicle.

In the vehicular control system according to the fourth aspect, the second execution device may be configured to perform a result transmitting process of transmitting a calculation result of the calculation process. The first execution device may be configured to perform a result receiving process of receiving the calculation result transmitted in the result transmitting process.

A vehicular control device according to a fifth aspect of the disclosure includes the first execution device in the vehicular control system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart illustrating a process flow which is performed by the control device according to the first embodiment;

FIG. 7 is a diagram illustrating definition of output variables according to the first embodiment.

FIG. 9A is a flowchart illustrating a process flow which is performed by the system according to the second embodiment;

FIG. 9B is a flowchart illustrating a process flow which is performed by the system according to the second embodiment;

FIG. 10 is a diagram illustrating definition of output variables according to the second embodiment.

DETAILED DESCRIPTION OF EMBODIMENTS

Figure 1:
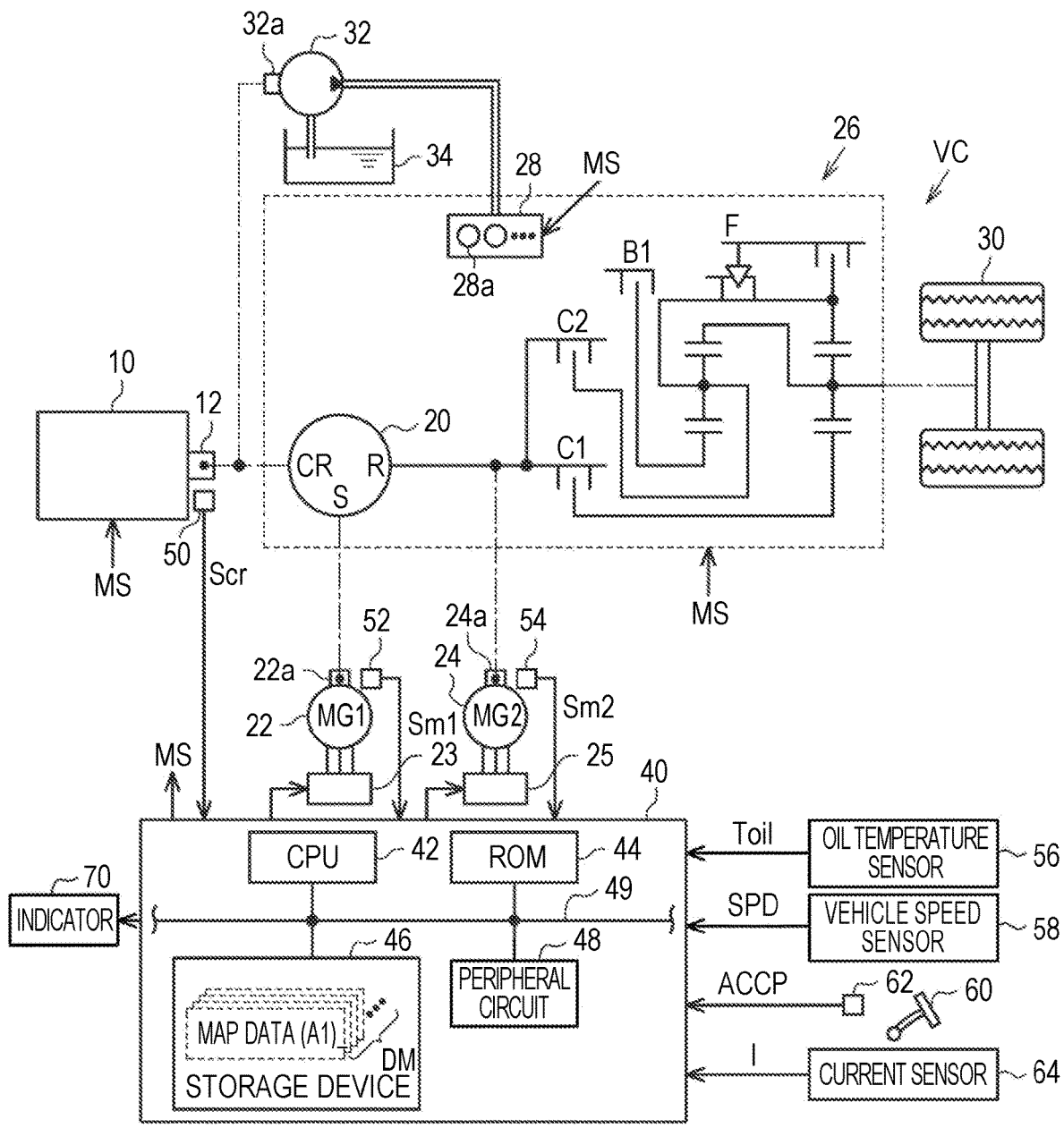
FIG. 1 is a diagram illustrating a configuration of a drive system and a control device for a vehicle according to a first embodiment of the disclosure.

Hereinafter, a first embodiment will be described with reference to the accompanying drawings. As illustrated in FIG. 1, a power split device 20 is mechanically connected to a crank shaft 12 of an internal combustion engine 10. The power split device 20 splits power of the internal combustion engine 10, a first motor/generator 22, and a second motor/generator 24. The power split device 20 includes a planetary gear mechanism, the crank shaft 12 is mechanically connected to a carrier CR of the planetary gear mechanism, a rotation shaft 22a of the first motor/generator 22 is mechanically connected to a sun gear S, and a rotation shaft 24a of the second motor/generator 24 is mechanically connected to a ring gear R. An output voltage of a first inverter 23 is applied to terminals of the first motor/generator 22. An output voltage of a second inverter 25 is applied to terminals of the second motor/generator 24.

In addition to the rotation shaft 24a of the second motor/generator 24, driving wheels 30 are additionally mechanically connected to the ring gear R of the power split device 20 via a gear shifting device 26. A driven shaft 32a of an oil pump 32 is mechanically connected to the carrier CR. The oil pump 32 is a pump that circulates oil in an oil pan 34 as a lubricant to the power split device 20 or discharges the oil as a hydraulic fluid to the gear shifting device 26. A pressure of the hydraulic fluid discharged from the oil pump 32 is adjusted by a hydraulic pressure control circuit 28 in the gear shifting device 26 and is used as a hydraulic fluid. The hydraulic pressure control circuit 28 is a circuit that includes a plurality of solenoid valves 28a and controls a flow state of the hydraulic fluid or a hydraulic pressure of the hydraulic fluid by turning on the solenoid valves 28a.

A control device 40 controls the internal combustion engine 10 and operates various operation units of the internal combustion engine 10 to control a torque, an exhaust gas component ratio, and the like as control values thereof. The control device 40 controls the first motor/generator 22 and operates the first inverter 23 to control a torque, a rotation speed, and the like as control values thereof. The control device 40 controls the second motor/generator 24 and operates the second inverter 25 to control a torque, a rotation speed, and the like as control values thereof.

The control device 40 controls the control values with reference to an output signal Scr of a crank angle sensor 50, an output signal Sm1 of a first rotational angle sensor 52 that detects a rotational angle of the rotation shaft 22a of the first motor/generator 22, or an output signal Sm2 of a second rotational angle sensor 54 that detects a rotational angle of the rotation shaft 24a of the second motor/generator 24. The control device 40 also refers to an oil temperature Toil which is a temperature of oil detected by an oil temperature sensor 56, a vehicle speed SPD detected by a vehicle speed sensor 58, an accelerator operation amount ACCP which is an amount of depression of an accelerator pedal 60 detected by an accelerator sensor 62, and a current I flowing in the solenoid valves 28a which is detected by a current sensor 64. The current sensor 64 actually includes a plurality of dedicated sensors that detects currents of the plurality of solenoid valves 28a.

The control device 40 includes a CPU 42 and a ROM 44, a storage device 46 which is an electrically rewritable nonvolatile memory, and a peripheral circuit 48, which can communicate with each other via a local network 49. Here, the peripheral circuit 48 includes a circuit that generates a clock signal for defining internal operations, a power supply circuit, and a reset circuit. The control device 40 controls the control values by causing the CPU 42 to execute a program stored in the ROM 44.

Figure 2:
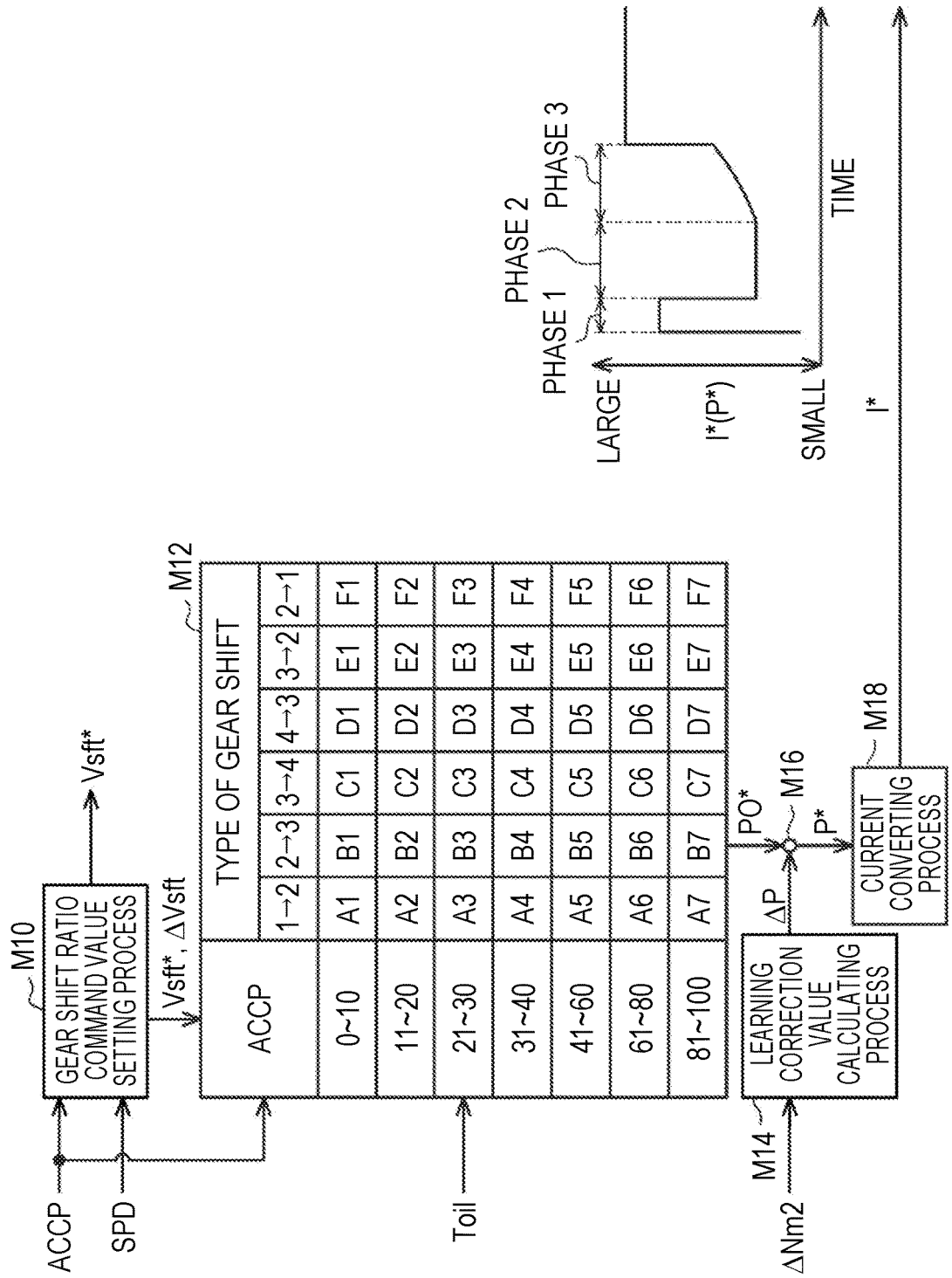
FIG. 2 is a block diagram illustrating processes which are performed by the control device according to the first embodiment.

FIG. 2 illustrates some processes which are performed by the control device 40. The processes illustrated in FIG. 2 are realized by causing the CPU 42 to repeatedly execute a program stored in the ROM 44, for example, at intervals of a predetermined period.

A gear shift ratio command value setting process M10 is a process of setting a gear shift ratio command value Vsft* which is a command value of a gear shift ratio based on the accelerator operation amount ACCP and the vehicle speed SPD in a switching period of the gear shift ratio. A hydraulic pressure command value setting process M12 is a process of setting a hydraulic pressure command value P0* which is a base value of a command value for a hydraulic pressure adjusted by a solenoid valve 28a used for the switching based on the accelerator operation amount ACCP, the oil temperature Toil, the gear shift ratio command value Vsft*, and a shift variable ΔVsft at the time of switching the gear shift ratio. Here, the shift variable ΔVsft indicates whether switching of the gear shift ratio is upshift or downshift. Accordingly, when the gear shift ratio command value Vsft* indicates the third gear stage and the shift variable ΔVsft is upshift, it means that a type of gear shift is a shift from the third gear stage to the fourth gear stage. The hydraulic pressure command value setting process M12 is realized by causing the CPU 42 to map-calculate the hydraulic pressure command value P0* in a state in which map data with the accelerator operation amount ACCP, the type of gear shift, and the oil temperature Toil as input variables and with the hydraulic pressure command value P0* as an output variable is stored in advance in the ROM 44. Map data is combination data of discrete values of input variables and values of output variables corresponding to the values of the input variables. The map calculation may be, for example, a process of outputting the value of the corresponding output variable of the map data as a result of calculation when a value of one input variable matches one of the values of the input variables of the map data and outputting a value obtained by interpolation of values of a plurality of output variables included in the map data as a result of calculation when the value of one input variable does not match any value of the input variables.

Specifically, the hydraulic pressure command value P0* includes Phase 1, Phase 2, and Phase 3 illustrated in FIG. 2. Here, Phase 1 is a period from a time at which a gear shift ratio switching command has been issued to a time at which a predetermined period has elapsed therefrom. Phase 2 is a period until a torque phase ends, and Phase 3 is a period until switching of the gear shift ratio ends. In Phase 3, the value of the output variable of the map data is actually set to a rate of increase of the hydraulic pressure command value P0*.

A learning correction value calculating process M14 is a process of calculating a correction value ΔP for correcting the hydraulic pressure command value P0* based on a blow amount ΔNm2 which is a difference between a rotation speed Nm2 of the rotation shaft 24a of the second motor/generator 24 and a reference rotation speed Nm2*. Here, when the blow amount ΔNm2 is a value in the switching period of the gear shift ratio in an area which is determined by the accelerator operation amount ACCP and the type of gear shift for determining the hydraulic pressure command value P0*, the correction value ΔP is a value in the area. The rotation speed Nm2 is calculated based on an output signal Sm2 of the second rotational angle sensor 54 by the CPU 42. The CPU 42 sets the gear shift ratio command value Vsft*, the shift variable ΔVsft, and the vehicle speed SPD as inputs for the reference rotation speed Nm2. This process can be realized by causing the CPU 42 to map-calculate the rotation speed Nm2* in a state in which map data with the gear shift ratio command value Vsft*, the shift variable ΔVsft, and the vehicle speed SPD as input variables and with the reference rotation speed Nm2* as an output variable is stored in advance in the ROM 44.

A correction process M16 is a process of calculating a hydraulic pressure command value P* by adding the correction value ΔP to the hydraulic pressure command value P0*. A current converting process M18 is a process of converting the hydraulic pressure command value P* to a command value of a current (a current command value I*) flowing in the solenoid valves 28a.

When the value of the gear shift ratio command value Vsft* changes, the control device 40 switches frictional engagement elements from a disengaged state to an engaged state by changing the current command value I* for each phase as illustrated in FIG. 2. The hydraulic pressure command value or the current command value corresponding to a frictional engagement element which is switched from the engaged state to the disengaged state can also be calculated by map calculation based on the aforementioned map data.

Figure 3:
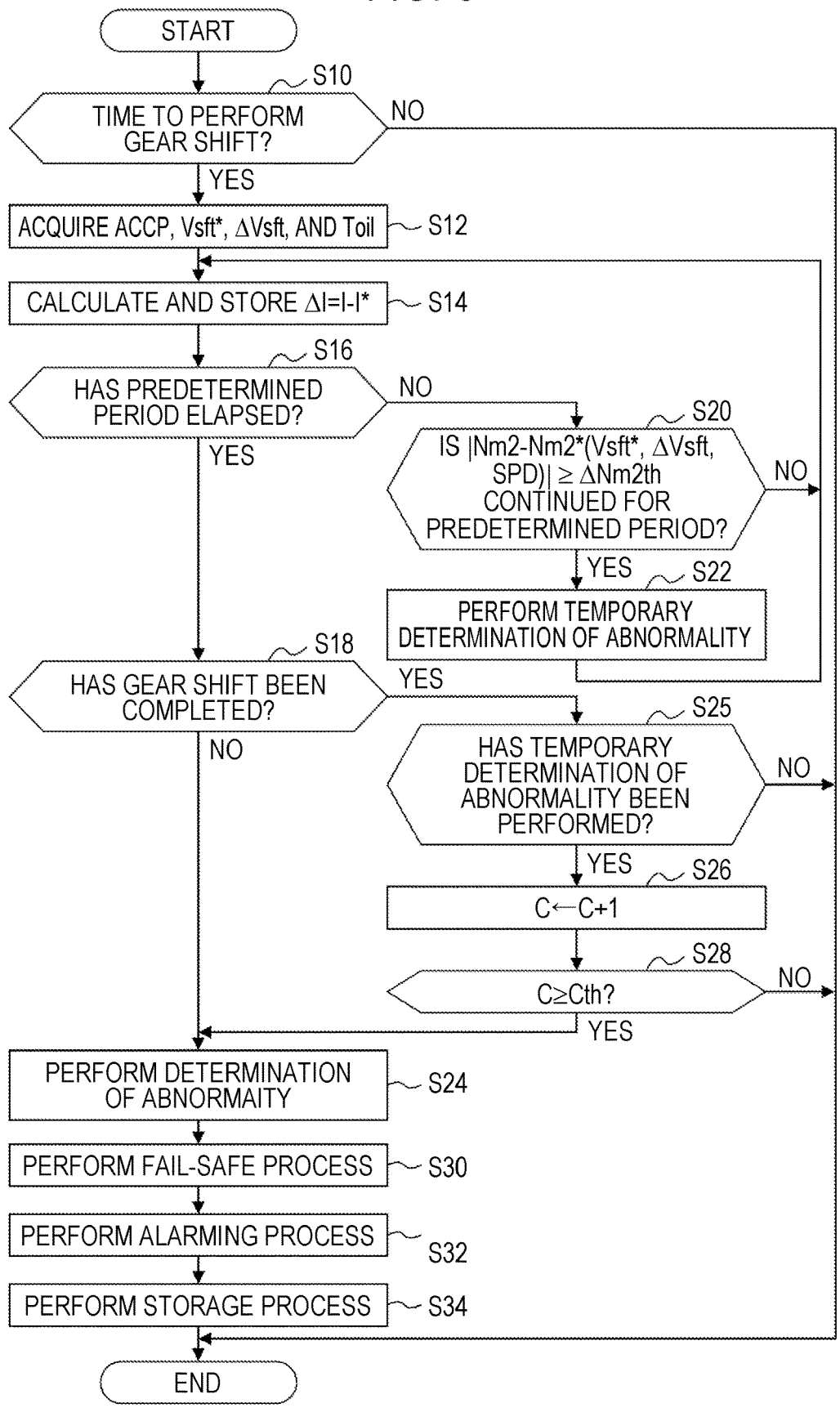
FIG. 3 is a flowchart illustrating a process flow which is performed by the control device according to the first embodiment.

FIG. 3 illustrates a flow of processes which are performed by the control device 40. The flow of processes illustrated in FIG. 3 is realized by causing the CPU 42 to repeatedly execute a program stored in the ROM 44, for example, at intervals of a predetermined period. In the following description, a numeral prefixed with "S" denotes a step number of each process.

In the series of processes illustrated in FIG. 3, the CPU 42 first determines whether it is time to control switching of the gear shift ratio (S10). When it is determined that it is time to control switching of the gear shift ratio (S10: YES), the CPU 42 acquires the accelerator operation amount ACCP, the gear shift ratio command value Vsft*, the shift variable ΔVsft, and the oil temperature Toil (S12). The CPU 42 calculates a current difference ΔI which is a difference between the current I flowing in the solenoid valves 28a for switching the frictional engagement elements which are switched from the disengaged state to the engaged state with this switching and the current command value I*, and stores the calculated current difference ΔI in the storage device 46 (S14).

Then, the CPU 42 determines whether a predetermined period has elapsed after the gear shift command has been issued (S16). Here, the predetermined period is set based on a maximum value of a time which is required for completion of gear shift control. When it is determined that the predetermined period has not yet elapsed (S16: NO), the CPU 42 determines whether a state in which an absolute value of the difference between the rotation speed Nm2 of the rotation shaft 24a of the second motor/generator 24 and the reference rotation speed Nm2* is equal to or greater than a threshold value ΔNm2th is continued for a predetermined time (S20). This process is a process of determining whether an abnormality has occurred in gear shift control.

Figure 4:
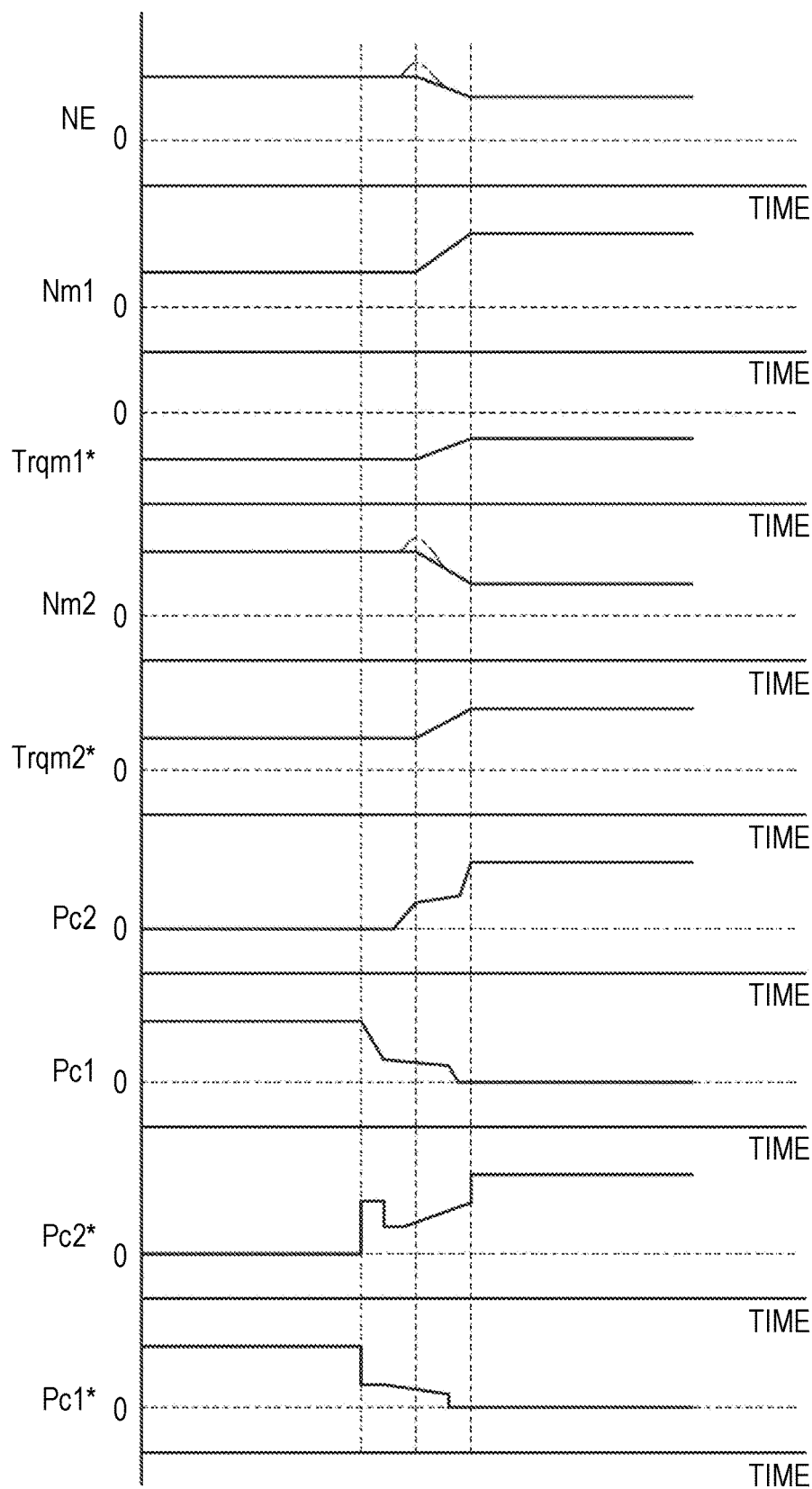
FIG. 4 is a timing chart illustrating blow amounts according to the first embodiment.

That is, when an abnormality occurs in gear shift control, a phenomenon in which an input-side rotation speed of the gear shifting device 26 increases greatly or the like occurs. Accordingly, as indicated by a one-dot chain line in FIG. 4, a phenomenon in which the rotation speed NE of the crank shaft 12 or the rotation speed Nm2 of the rotation shaft 24a of the second motor/generator 24 increases occurs. FIG. 4 illustrates changes of hydraulic pressures Pc2 and Pc1 and command values Pc2* and Pc1* thereof together with changes of the rotation speeds NE, Nm1, and Nm2, and torque command values Trqm1* and Trqm2*. Here, the rotation speed NE is the rotation speed of the crank shaft 12, and the rotation speed Nm1 is the rotation speed of the rotation shaft 22a of the first motor/generator 22. The torque command value Trqm1* is a torque command value for the first motor/generator 22 and the torque command value Trqm2* is a torque command value for the second motor/generator 24. The hydraulic pressure Pc2 and the hydraulic pressure Pc1 are a hydraulic pressure of an engagement-side element and a hydraulic pressure of disengagement-side element out of the frictional engagement elements which are required for gear shift illustrated in FIG. 4.

The command values Pc2* and Pc1* are set such that occurrence of a phenomenon in which the input-side rotation speed of the gear shifting device 26 increases or the like is curbed. The rotation speed Nm2* serving as a reference at the time of gear shift is determined by this setting.

Referring back to FIG. 3, when it is determined that the state is continued for the predetermined time or more (S20: YES), the CPU 42 temporarily determines that an abnormality has occurred (S22). The CPU 42 returns the process flow to the process of S14 when the process of S22 has been completed or when the determination result of the process of S20 is negative.

On the other hand, when it is determined that the predetermined period has elapsed (S16: YES), the CPU 42 determines whether the gear shift has been completed (S18). Here, the CPU 42 can determine that the gear shift has not been completed when the actual gear shift ratio has not reached the gear shift ratio command value Vsft*. When it is determined that the gear shift has not been completed (S18: NO), the CPU 42 determines that an abnormality has occurred (S24).

On the contrary, when it is determined that the gear shift has been completed (S18: YES), the CPU 42 determines whether temporary determination of an abnormality has been performed (S25). When it is determined that temporary determination of an abnormality has been performed (S25: YES), the CPU 42 increments a counter C by "1" (S26). Then, the CPU 42 determines whether the value of the counter C is equal to or greater than a predetermined value Cth which is greater than "1" (S28). When it is determined that the value of the counter C is equal to or greater than the predetermined value Cth (S28: YES), the CPU 42 determines that an abnormality has occurred (S24). Then, the CPU 42 performs a fail-safe process of fixing the gear shift ratio to a predetermined gear shift ratio (S30). The predetermined gear shift ratio is a gear shift ratio at which a frictional engagement element which has to be in the engaged state when an abnormality occurs is switched to the disengaged state.

The CPU 42 performs an alarm process of causing an indicator 70 to display visual information indicating that an abnormality has occurred by operating the indicator 70 illustrated in FIG. 1 (S32). Then, the CPU 42 stores data indicating that the determination of an abnormality has been performed and the accelerator operation amount ACCP, the gear shift ratio command value Vsft*, the shift variable ΔVsft, and the oil temperature Toil when the abnormality has occurred in the storage device 46 (S34).

The CPU 42 temporarily ends a series of processes illustrated in FIG. 3 when the process of S34 has been completed or when the determination results of S10, S25, and S28 are negative. FIG. 5 illustrates another flow of processes which are performed by the control device 40. The processes illustrated in FIG. 5 are realized by causing the CPU 42 to repeatedly execute a program stored in the ROM 44, for example, at intervals of a predetermined period.

In a series of processes illustrated in FIG. 5, the CPU 42 first determines whether determination of an abnormality has been performed through the flow of processes illustrated in FIG. 3 (S40). When it is determined that the determination of an abnormality has been performed (S40: YES), the CPU 42 reads the accelerator operation amount ACCP, the gear shift ratio command value Vsft*, and the shift variable ΔVsft stored in the storage device 46 in the process of S34 in FIG. 3 (S42). Then, the CPU 42 selects and reads corresponding map data DM out of the map data DM stored in the storage device 46 illustrated in FIG. 1 based on the accelerator operation amount ACCP and the type of gear shift when the abnormality has occurred (S44). That is, map data DM corresponding to areas A1, A2, . . . , A7, B1, . . . subjected to division based on the accelerator operation amount ACCP and the type of gear shift used to determine the hydraulic pressure command value P0* in the hydraulic pressure command value setting process M12 illustrated in FIG. 2 is stored in the storage device 46.

Then, the CPU 42 reads current differences ΔI(1), ΔI(2), . . . , and ΔI(n) which are time-series data of the current difference ΔI stored in the process of S14 in FIG. 3 (S46). The current differences ΔI(1), ΔI(2), . . . , and ΔI(n)

are time-series data of the current difference ΔI in a period in which the gear shift ratio is switched when it is determined that an abnormality has occurred. The time-series data of the current difference ΔI is data having a correlation with a cause of an abnormality.

Figure 6A:
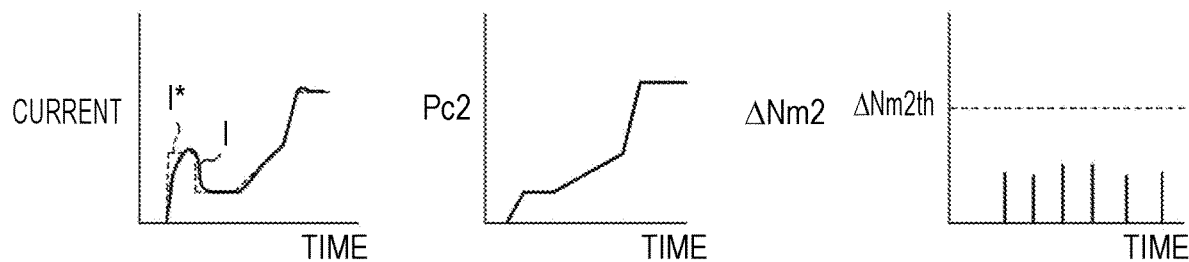
FIG. 6A is a timing chart illustrating a relationship between a behavior of a current and a rotation speed at the time of gear shifting and an abnormality cause according to the first embodiment.
Figure 6B:
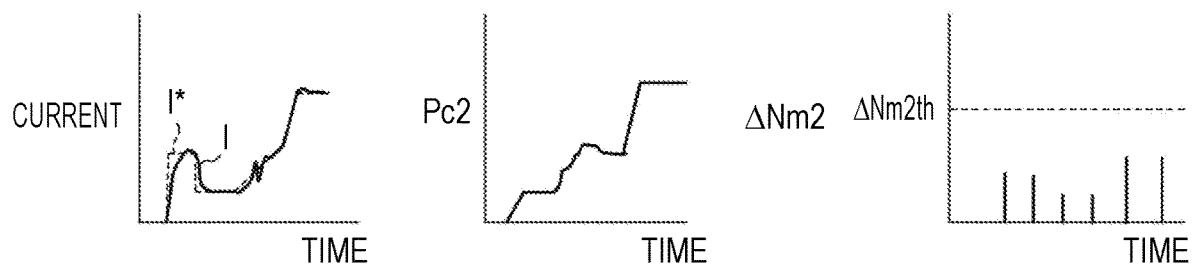
FIG. 6B is a timing chart illustrating a relationship between a behavior of a current and a rotation speed at the time of gear shifting and an abnormality cause according to the first embodiment.
Figure 6C:
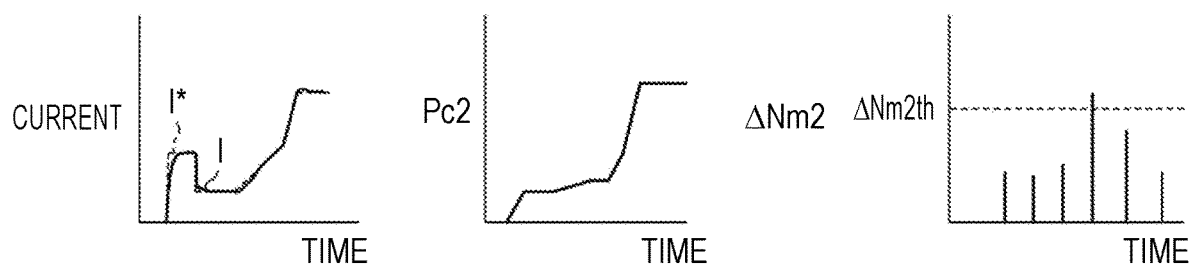
FIG. 6C is a timing chart illustrating a relationship between a behavior of a current and a rotation speed at the time of gear shifting and an abnormality cause according to the first embodiment.
Figure 6D:
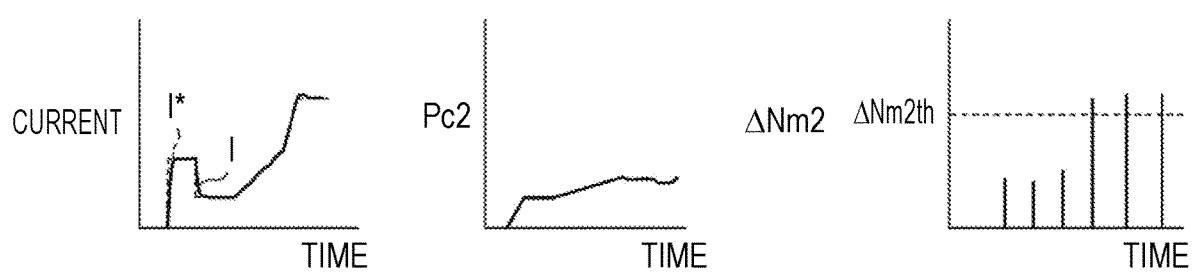
FIG. 6D is a timing chart illustrating a relationship between a behavior of a current and a rotation speed at the time of gear shifting and an abnormality cause according to the first embodiment.

FIGS. 6A to 6D illustrate changes of the current I, the hydraulic pressure Pc2, and a blow amount ΔNm2 by which the rotation speed Nm2 is higher than the reference rotation speed Nm2* at the time of gear shift. Six sampled values of the blow amount ΔNm2 are illustrated in the right parts of FIGS. 6A to 6D. Here, FIG. 6A illustrates an example of the changes in a normal state and FIGS. 6B to 6D illustrate examples of the changes in an abnormal state.

Specifically, FIG. 6B illustrates an example in which the rotation speed Nm2 exhibits a behavior different from that in a normal state because air is mixed into the solenoid valves 28a and an abnormality occurs in control of the hydraulic pressure Pc2 by feedback control. The actual behavior of the current at this time is different from that in a normal state. FIG. 6C illustrates an example in which foreign substance is mixed into the solenoid valves 28a and a temporary stick which is an abnormality in which the valves do not operate temporarily occurs. In this case, the blow amount ΔNm2 temporarily exceeds a threshold value Nm2th due to temporary bluntness of an increase of the hydraulic pressure Pc2. The behavior of the current I at this time is different from that illustrated in FIG. 6B. FIG. 6D illustrates an example in which foreign substance is mixed into the solenoid valves 28a and a full stick which is an abnormality in which the valves do not operate normally occurs. In this case, since the hydraulic pressure Pc2 is low, the frictional engagement elements are not switched to the engaged state and a state in which the blow amount ΔNm2 is greater than the threshold value Nm2th is continued. The behavior of the current I in this case is also different from that illustrated in FIG. 6B.

Referring to FIG. 5, the CPU 42 reads current differences ΔI(-p+1), ΔI(-p+2), . . . , and ΔI(-p+n) which are time-series data of the current difference ΔI stored in the process of S14 in FIG. 3 in a period in which the same switching of a gear shift ratio as when an abnormality has occurred is performed before it is determined that an abnormality has occurred (S48). Here, the "same switching of a gear shift ratio as when an abnormality has occurred" means that the type of gear shift and the accelerator operation amount ACCP are in the same area as when an abnormality has occurred out of areas A1, A2, . . . which are used to set the hydraulic pressure command value P0* illustrated in FIG. 2. It is more preferable to further employ a condition that an absolute value of a difference in oil temperature Toil from that when an abnormality has occurred is equal to or less than a predetermined value.

Then, the CPU 42 substitutes the time-series data acquired in the processes of S46 and S48 into input variables x(1) to x(2n) of a map which is defined by the map data DM selected in the process of S44 (S50). That is, with "i=1 to n," the current difference ΔI(i) is substituted into the input variable x(i) and the current difference ΔI(-p+i) is substituted into the input variable x(n+i).

Then, the CPU 42 calculates values of output variables y(1), y(2), . . . , y(q) by substituting the values of the input variables x(1) to x(2n) to the map which is defined by the map data DM selected in the process of S44 (S52).

In the first embodiment, a function approximation operator is exemplified as a map and, for example, a total-binding forward-propagation type neural network with a single intermediate layer is exemplified. Specifically, a value of a node of the intermediate layer is determined by substituting "m" values obtained by converting the input variables x(1) to x(2n) into which values are substituted in the process of S50 and a bias parameter x(0) using a linear map which is defined by coefficients wFjk (where j=1 to m, k=0 to 2n) into an activation function f. In addition, values of the output variables y(1), y(2), y(3) . . . are determined by substituting values, which are obtained by converting the value of the node of the intermediate layer using the linear map defined by the coefficients wSij, into an activation function g. In the first embodiment, a hyperbolic tangent function is exemplified as the activation function f. A softmax function which is a smooth curve and which maximizes one output value is exemplified as the activation function g.

As illustrated in FIG. 7, the output variables y(1), y(2), y(3), . . . are cause variables for identifying a cause of an abnormality. In FIG. 7, the output variable y(1) indicates a probability that the mixing of air illustrated in FIG. 6B will occur, the output variable y(2) indicates a probability that a temporary stick illustrated in FIG. 6C will occur, and the output variable y(3) indicates a probability that a full stick illustrated in FIG. 6D will occur.

Referring back to FIG. 5, the CPU 42 selects a maximum value ymax out of the output variables y(1) to y(q) (S54). Then, the CPU 42 identifies a cause of the abnormality based on the same output variable as the maximum value ymax out of the output variables y(1) to y(q) and stores the result of identification of the cause in the storage device 46 (S56). For example, when the value of the output variable y(1) is the same as the maximum value ymax, the CPU 42 stores data indicating that the cause of determination of the abnormality is the mixing of air in the storage device 46.

The CPU 42 temporarily ends a series of processes illustrated in FIG. 5 when the process of S56 has been completed or when the determination result of the process of S40 is negative. Each of the map data DM is a model trained using the current difference ΔI obtained by driving a prototype vehicle or the like and data indicating whether an actual abnormality has occurred as training data before shipment of the vehicle VC.

Operations and advantages of the first embodiment will be described below. The CPU 42 determines whether an abnormality has occurred in gear shift control based on the fact that the absolute value of the difference between the rotation speed Nm2 in a switching period of the gear shift ratio and the reference rotation speed Nm2* is equal to or greater than a threshold value ΔNm2th. When it is determined that an abnormality has occurred, the CPU 42 performs a fail-safe process and notifies a user that an abnormality has occurred. When it is determined that an abnormality has occurred, the CPU 42 identifies a cause of the abnormality based on the current I at that time. By referring to the behavior of the current I in this way, it is possible to identify a cause of the abnormality.

The following operations and advantages are obtained according to the first embodiment described above. (1) The current difference ΔI instead of the current I is used as the input variable of the map. In the first embodiment, since the hydraulic pressure command value P0* is corrected based on the correction value ΔP, the current command value I* varies depending on the correction value ΔP even in the same area which is defined by the accelerator operation amount ACCP and the type of gear shift. Even when the area defined by the accelerator operation amount ACCP and the type of gear shift is the same and the oil temperature Toil is the same, the current command value I* varies due to map calculation. Accordingly, the behavior of the current I varies depending on the current command value I*, which is not directly associated with an abnormality. Accordingly, by using the current difference ΔI instead of the current I, it is possible to curb variation of the input variable x due to variation of the current command value I*. In this way, by processing information serving as an abnormality cause as a feature and inputting the processed information to a map, it is possible to more accurately calculate the value of the output variable.

(2) The map data DM which is used to calculate the output variable is selected according to the type of gear shift. Since appropriate control varies depending on the type of gear shift, the behavior of the current I can vary depending on the gear shift ratio. When a single map is used regardless of the type of gear shift, the demands with regard to the map are high. On the other hand, according to the first embodiment, map data which differs depending on the type of gear shift is prepared and the value of the output variable is calculated using the corresponding map data. Accordingly, it is possible to perform accurate learning with the small number of pieces of training data which are used for learning of the respective maps, to accurately calculate the value of the output variable with a small number of dimensions of the input variables, or to accurately calculate the value of the output variable with a simple structure.

(3) The map data DM which is used to calculate the output variable is selected according to the accelerator operation amount ACCP. The accelerator operation amount ACCP has a positive correlation with the torque which is applied to the driving wheels 30. On the other hand, since a torque applied to the gear shifting device 26 varies depending on the torque applied to the driving wheels 30, appropriate control varies in the switching period of the gear shift ratio. Accordingly, the behavior of the current varies depending on the accelerator operation amount ACCP. Accordingly, when a single map is used regardless of the accelerator operation amount ACCP, the demands with regard to the map are high. On the other hand, according to the first embodiment, map data which differs depending on the accelerator operation amount ACCP is prepared and the value of the output variable is calculated using the corresponding map data. Accordingly, it is possible to perform accurate learning with the small number of pieces of training data which are used for learning of the respective maps, to accurately calculate the value of the output variable with a small number of dimensions of the input variable, or to accurately calculate the value of the output variable with a simple structure.

(4) In addition to the current differences ΔI(1) to ΔI(n) in the present switching period in which the gear shift ratio is switched in the gear shifting device 26, the current differences ΔI(-p+1) to and ΔI(-p+n) when the same switching was performed in the past are included in the input variables which are simultaneously input to the map. Accordingly, it is possible to calculate a value of a cause variable in consideration of a history and trends in the behavior of the current.

(5) When the degree of separation between the rotation speed Nm2 and the reference rotation speed Nm2* in the switching period of the gear shift ratio is equal to or greater than a predetermined value, it is determined that an abnormality has occurred in the gear shifting device 26, and the values of the output variables y(1) to y(q) are calculated based on the current difference ΔI when it is determined that the abnormality has occurred. Accordingly, when it is determined that an abnormality has occurred, it is possible to specifically determine a cause of the abnormality.

(6) When the values of the output variables y(1) to y(q) are calculated, the CPU 42 stores a cause identified based on a maximum value thereof in the storage device 46. Accordingly, when a user having been notified of an alarm drives the vehicle to, for example, a repair shop, an entity that determines what treatment to perform on the vehicle can determine the treatment based on the calculation result stored in the storage device 46. That is, for example, when air mixing has occurred, it is possible to check whether an anti-foaming agent or the like included in the hydraulic fluid has deteriorated. When the hydraulic fluid has deteriorated, it is possible to propose replacement of the hydraulic fluid without disassembling the gear shifting device 26. For example, when temporary stick has occurred, it is possible to check the operation. When the device operates normally, it is possible to notify a user that an abnormality has temporarily occurred due to the temporary stick without disassembling the gear shifting device 26.

Hereinafter, a second embodiment of the disclosure will be described with reference to the drawings with a focus on differences from the first embodiment.

Figure 8:
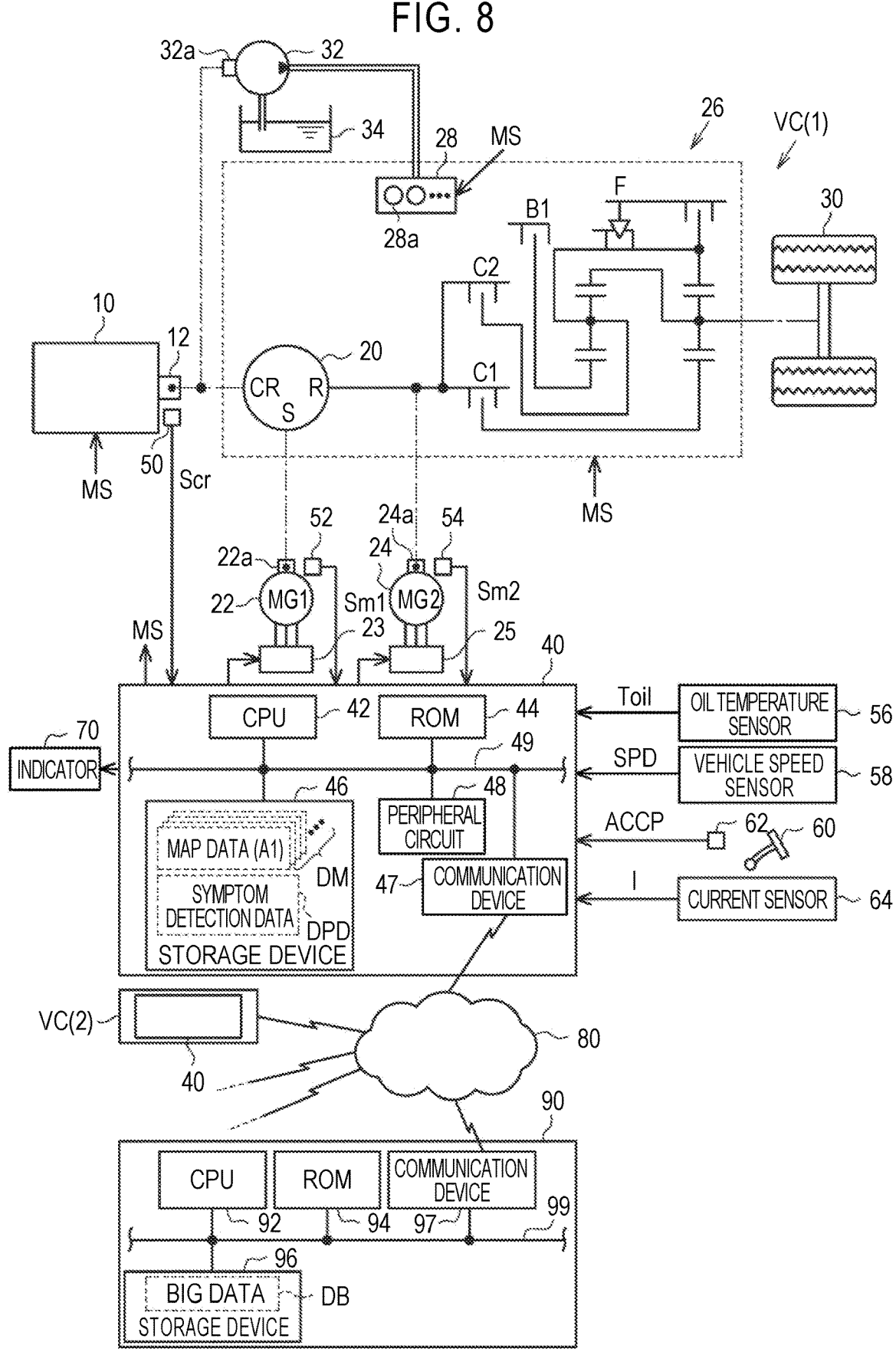
FIG. 8 is a diagram illustrating a configuration of a system according to a second embodiment of the disclosure.

FIG. 8 illustrates a configuration of a system according to the second embodiment. In FIG. 8, elements corresponding to the elements illustrated in FIG. 1 will be referred to by the same reference signs for the purpose of convenience, and description thereof will not be repeated. As illustrated in FIG. 8, symptom detection data DPD in addition to the map data DM is stored in the storage device 46 of a vehicle VC(1). The control device 40 includes a communication device 47 and can communicate with a data analysis center 90 via an external network 80 using the communication device 47.

The data analysis center 90 collects and analyzes data transmitted from a plurality of vehicles VC(1), VC(2), . . . as big data DB. The data analysis center 90 includes a CPU 92, a ROM 94, a storage device 96, and a communication device 97, which can communicate with each other via a local network 99. The storage device 96 is a nonvolatile memory which is electrically rewritable, and stores big data DB.

In the second embodiment, before an abnormality occurs in gear shift control, a symptom of the abnormality of the gear shifting device 26 is detected and a symptom detection result to the data analysis center 90 is transmitted. FIGS. 9A and 9B illustrate a flow of processes associated with transmission and reception of the symptom detection result which are performed by system illustrated in FIG. 8. Particularly, in FIGS. 9A and 9B, a flow of processes associated with transmission and reception of the symptom detection result of an abnormality in a part associated with a first clutch is illustrated. Processes associated with transmission and reception of the symptom detection result of an abnormality in a part associated with another clutch or a brake are the same as in the processes illustrated in FIGS. 9A and 9B and thus description thereof will be omitted.

Specifically, the processes illustrated in FIG. 9A are realized by causing the CPU 42 to repeatedly execute a program stored in the ROM 44, for example, at intervals of a predetermined period. The processes illustrated in FIG. 9B are realized by causing the CPU 92 to repeatedly execute a program stored in the ROM 94, for example, at intervals of a predetermined period.

In a series of processes illustrated in FIG. 9A, the CPU 42 first acquires a gear shift ratio command value Vsft* (S60). Then, the CPU 42 determines whether a current gear shift ratio is a gear shift ratio for maintaining a first clutch in a disengaged state based on the gear shift ratio command value Vsft* (S62). Then, when it is determined that the current gear shift ratio maintains the first clutch in the disengaged state (S62: YES), the CPU 42 performs dither control which is control for finely increasing or decreasing a turn-on current of the corresponding solenoid valve 28a of the hydraulic pressure control circuit 28 (S64). The dither control is a process of causing a turn-on current, which causes the solenoid valve 28a to vibrate finely, to flow and the amplitude of the vibration is in a range in which the first clutch is not displaced.

Then, the CPU 42 detects the current I of the corresponding solenoid valve 28a (S66). Then, the CPU 42 determines whether a continuous execution period of the dither control reaches a predetermined period after the process of S70 which will be described later has been completed (S68). When it is determined that the continuous execution period reaches the predetermined period (S68: YES), the CPU 42 substitutes the currents I(1), I(2), . . . , I(n) which are time-series data detected in the process of S66 in the predetermined period into the input variables x(1) to x(n) of a map which is defined by the symptom detection data DPD stored in the storage device 46 illustrated in FIG. 8 (S70).

Then, the CPU 42 calculates values of output variables z(1), z(2), z(p) by substituting the values of the input variables x(1) to x(n) to the map which is defined by the symptom detection data DPD (S72).

In the second embodiment, a function approximation operator is exemplified as the map and, for example, a total-binding forward-propagation type neural network with a single intermediate layer is exemplified. Specifically, a value of a node of the intermediate layer is determined by substituting "m" values obtained by converting the input variables x(1) to x(n) into which values are substituted in the process of S70 and a bias parameter x(0) using a linear map which is defined by coefficients wOjk (where j=1 to m, k=0 to n) into an activation function f. In addition, the values of the output variables z(1), z(2), z(3) . . . are determined by substituting values which are obtained by converting the value of the node of the intermediate layer using a linear map defined by coefficients wTij into an activation function u. In the second embodiment, a hyperbolic tangent function is exemplified as the activation function h. A softmax function is exemplified as the activation function u.

As illustrated in FIG. 10, the output variable z(1) is a cause variable indicating a normal probability, the output variable z(2) is a variable indicating a probability that mixing of air will occur, and the output variable z(3) is a variable indicating a probability that a temporary stick will occur.

Referring back to FIGS. 9A and 9B, the CPU 42 extracts a maximum value zmax out of the values of the output variables z(1), z(2), z(3), . . . (S74). Then, the CPU 42 determines whether the value of the output variable z(1) is the same as the maximum value zmax (S76). This process is a process of determining whether a part associated with the first clutch is normal. When it is determined that one other than the output variable z(1) is the maximum value zmax (S76: NO), the CPU 42 transmits a notification indicating that there is a symptom of an abnormality at the time of gear shift control and information for identifying a type of the abnormality by operating the communication device 47 (S78).

The CPU 42 temporarily ends a series of processes illustrated in FIG. 9A when the process of S78 has been completed or when the determination result of the process of S76 is positive or when the determination results of the processes of S62 and S68 are negative.

On the other hand, the CPU 92 of the data analysis center 90 determines whether a notification indicating the symptom detection result has been received (S80), and stores the detection result as big data DB in the storage device 96 (S82) when it is determined that a notification has been received (S80: YES). The CPU 92 temporarily ends a series of processes illustrated in FIG. 9B when the process of S82 has been completed or when the determination result of the process of S80 is negative.

The symptom detection data DPD is a model trained using time-series data before gear shift is normally performed out of time-series data of the current I collected at the time of driving a prototype vehicle or the like and time-series data immediately before an abnormality has occurred in gear shift control as training data before shipment of vehicles VC(1), VC(2), . . . .

As described above, according to the second embodiment, dither control for increasing or decreasing a turn-on current of a corresponding solenoid valve is performed in a state in which a clutch or a brake is disengaged and it is determined whether there is a symptom of an abnormality in gear shift control based on the behavior of the turn-on current of the solenoid valve at that time. When a symptom is detected, the data analysis center 90 can collect symptom detection results of a plurality of vehicles VC(1), VC(2), . . . by providing the detection results to the data analysis center 90. Accordingly, by collecting determination results indicating that an abnormality has occurred actually thereafter, it is possible to analyze what behavior causes a later abnormality based on the big data DB. As a result, when it is determined that the symptom detection result is not appropriate, the symptom detection data DPD can be re-trained. When reliability of the symptom detection results based on the symptom detection data DPD is high, a user may be notified that an abnormality will be likely to occur before the abnormality occurs actually in gear shift control.

Hereinafter, a third embodiment will be described with reference to the drawings with a focus on differences from the first embodiment.

Figure 11:
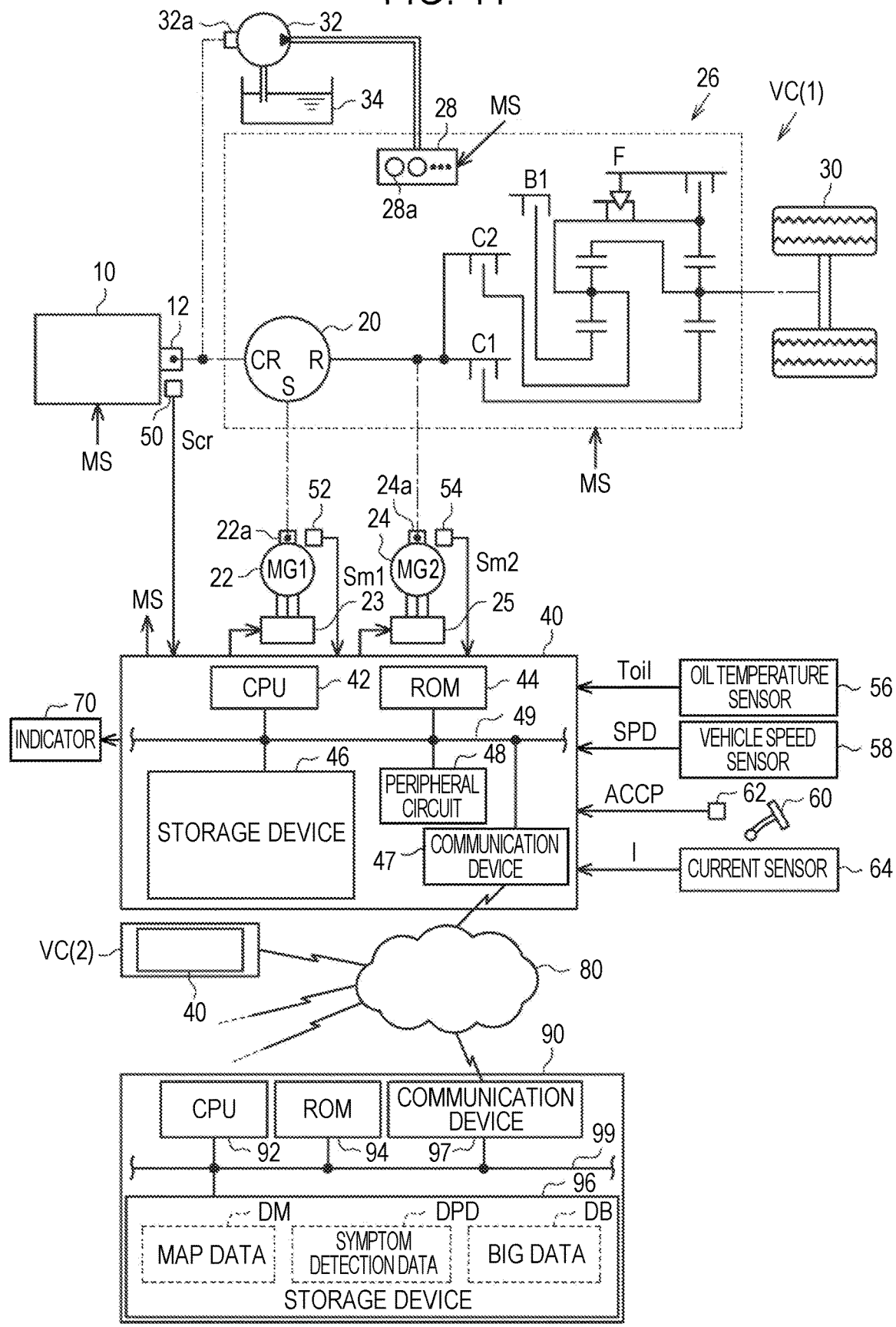
FIG. 11 is a diagram illustrating a configuration of a system according to a third embodiment of the disclosure.

FIG. 11 illustrates a configuration of a system according to the third embodiment. In FIG. 11, elements corresponding to the elements illustrated in FIG. 8 will be referred to by the same reference signs for the purpose of convenience. As illustrated in FIG. 11, in the third embodiment, map data DM or symptom detection data DPD is stored in the storage device 96 of the data analysis center 90.

Figure 12A:
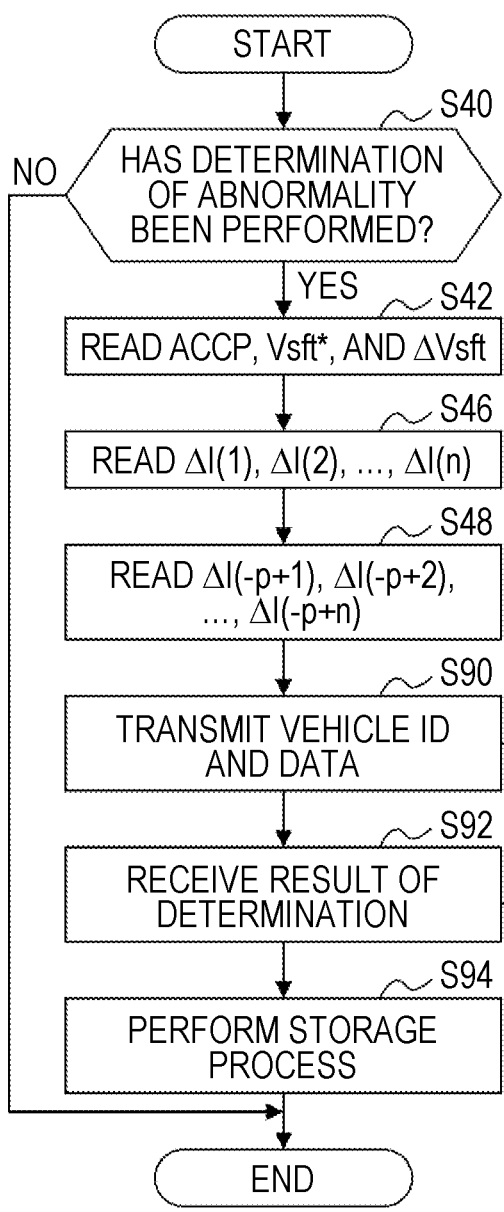
FIG. 12A is a flowchart illustrating a process flow which is performed by the system according to the third embodiment.
Figure 12B:
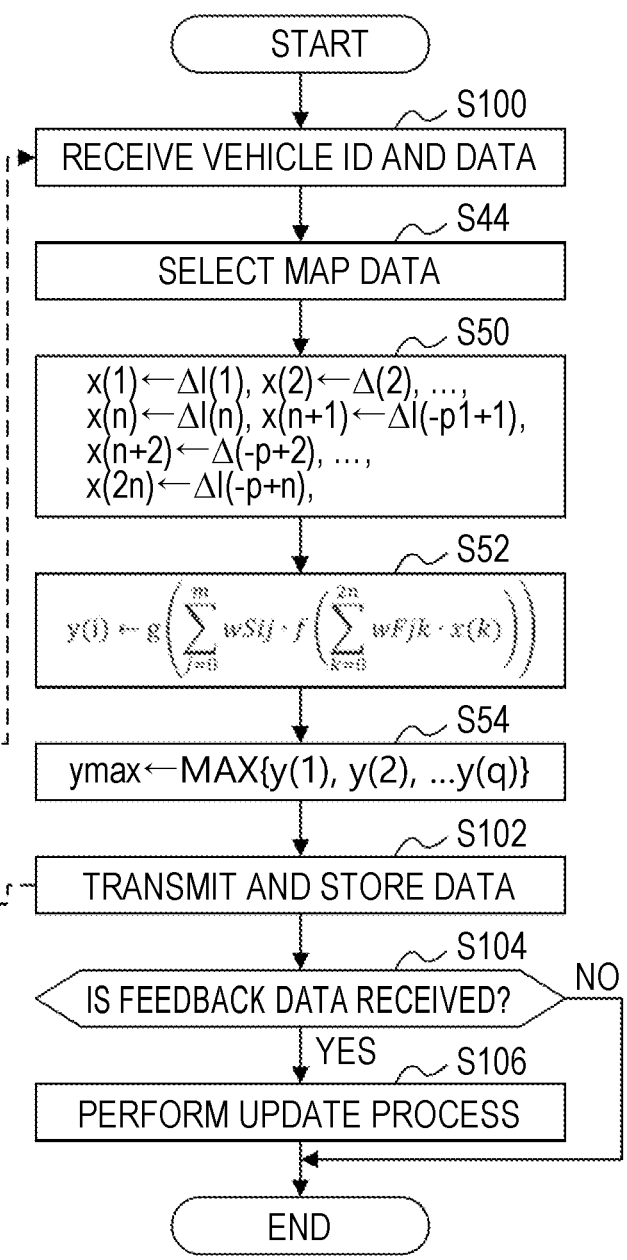
FIG. 12B is a flowchart illustrating a process flow which is performed by the system according to the third embodiment.

FIGS. 12A and 12B illustrate a flow of processes for determining an abnormality cause based on the output variables y(1), y(2), . . . which is performed by the system illustrated in FIG. 11. Specifically, the processes illustrated in FIG. 12A are realized by causing the CPU 42 to repeatedly execute a program stored in the ROM 44, for example, at intervals of a predetermined period. The processes illustrated in FIG. 12B are realized by causing the CPU 92 to repeatedly execute a program stored in the ROM 94, for example, at intervals of a predetermined period. In the processes illustrated in FIGS. 12A and 12B, processes corresponding to the processes illustrated in FIG. 5 will be referred to by the same step numbers for the purpose of convenience and description thereof will not be repeated. A series of processes illustrated in FIGS. 12A and 12B will be described below along a time series of the processes of determining an abnormality cause based on the output variables y(1), y(2), . . . .

As illustrated in FIG. 12A, the CPU 42 of the control device 40 performs the processes of S40, S42, S46, and S48 and then transmits data read in the processes of S42, S46, and S48 along with an identifier of the vehicle VC(1) by operating the communication device 47 (S90).

On the other hand, as illustrated in FIG. 12B, the CPU 92 of the data analysis center 90 receives the data and the identifier transmitted in the process of S90 (S100). Then, the CPU 92 performs the processes of S44 and S50 to S54 using the received data. Then, the CPU 92 transmits data associated with the result of determination of an abnormality cause based on a variable with a maximum value ymax out of the output variables y(1) to y(q) to a transmission source of the data received in the process of S100 by operating the communication device 97, and stores the data in the storage device 96 (S102).

On the other hand, as illustrated in FIG. 12A, the CPU 42 receives data associated with the result of determination transmitted in the process of S102 (S92). Then, the CPU 42 stores the result of determination in the storage device 46 (S94).

The CPU 42 temporarily ends a series of processes illustrated in FIG. 12A when the process of S94 has been completed or when the determination result of the process of S40 is negative. Accordingly, when a user drives the vehicle VC(1) to a repair shop through the alarm process of S32 in FIG. 3, the repair shop can understand the abnormality cause by accessing the storage device 46. For example, when a result of determination indicating that the abnormality is a temporary stick is stored and the abnormality in gear shift control is not relieved, the repair shop identifies the abnormality cause. When it is determined that the result of determination is not valid, the repair shop notifies the data analysis center 90 of data indicating the fact.

On the other hand, as illustrated in FIG. 12B, the CPU 92 of the data analysis center 90 determines whether feedback has been performed (S104). When the feedback has been performed (S104: YES), the CPU 92 updates the map data DM such that the value of the output variable of the map which is defined by the map data DM with the values of the input variables x(1) to x(2n) input thereto when the erroneous determination has been performed represents a correct abnormality cause which has been fed back (S106).

The CPU 92 temporarily ends a series of processes illustrated in FIG. 12B when the process of S106 has been completed or when the determination result of the process of S104 is negative. In addition, the process of calculating the values of the output variables z(1), z(2), . . . can be performed in the same way as the processes illustrated in FIGS. 12A and 12B and thus description thereof will not be repeated.

In this way, according to the third embodiment, it is possible to decrease a calculation load of the CPU 42 by causing the outside of the vehicle VC(1) to perform the process of S52. When the result of determination of a cause in the processes of S52 to S54 is erroneous, the map data DM can be updated. Particularly, a result of determination of a cause using a map defined by the map data DM for an abnormality having occurred in various driving situations by various users after the vehicles VC(1), VC(2), . . . have been shipped can be verified.

Correspondence in elements between the claims and the embodiments will be described below. The correspondence is described below in the order of description in the "SUMMARY." An example of an abnormality cause determining device is the control device 40 illustrated in FIG. 1 or 8 or the data analysis center 90 illustrated in FIG. 11. An example of an electromagnetic actuator is the solenoid valve 28a. An example of an execution device is the CPU 42 or the ROM 44 illustrated in FIGS. 1 and 8 or the CPU 92 and the ROM 94 illustrated in FIG. 11. An example of a storage device is the storage device 46 illustrated in FIGS. 1 and 8 or the storage device 96 illustrated in FIG. 11. An example of a current variable is the current difference $\Delta I$. When an example of the abnormality cause determining device is the control device 40, an example of an acquisition process is the processes of S46 and S48. When an example of the abnormality cause determining device is the data analysis center 90, an example of the acquisition process is the process of S100. An example of a calculation process is the process of S52. An example of a selection process is the process of S44. An example of a "variable indicating a current flowing in the solenoid valve when the same switch was performed in the past" is the current differences $\Delta I(-p+1)$, $\Delta I(-p+2)$, . . . , and $\Delta I(-p+n)$. An example of a vehicular control device is the control device 40 illustrated in FIGS. 1 and 8. An example of an abnormality determining process is the process of S24. An example of an alarming process is the process of S32. An example of a storage process is the process of S56. An example of first map data is the map data DM. An example of second map data is the symptom detection data DPD. An example of a second acquisition process is the process of S66. An example of a second calculation process is the process of S72. An example of a notification e=process is the process of S78. An example of a first execution device is the CPU 42 and the ROM 44 illustrated in FIG. 11, and an example of a second execution device is the CPU 92 and the ROM 94. An example of a data transmitting process is the process of S90. An example of a data transmitting process is the process of S100. An example of a feedback process is the process of S104. An example of an update process is the process of S106. An example of a result transmitting process is the process of S102 and an example of a result receiving process is the process of S92.

The embodiments can be modified in other forms as follows. The embodiments and the following modified examples can be combined with each other unless a technical confliction arises.

A selection process will be described below. In the aforementioned embodiment, the accelerator operation amount ACCP is used as a torque variable which is a variable indicating a torque applied to the driving wheels 30, but the disclosure is not limited thereto. For example, a command value for a drive torque which is determined from the accelerator operation amount ACCP may be calculated and the calculated command value for the torque may be used as the torque variable.

In the aforementioned embodiment, processes of selecting one of a plurality of pieces of map data DM(A1), DM(A2), . . . which are different based on a torque variable and a type of gear shift and using the selected one as map data which is used to calculate the values of the output variables y(1), y(2), . . . have been described above, but the disclosure is not limited thereto. For example, a plurality of pieces of map data which are different based on a torque variable regardless of a type of gear shift may be provided, one thereof may be selected based on the torque variable and used as map data which is used to calculate the values of the output variables y(1), y(2), . . . . For example, a plurality of pieces of map data which are different based on a type of gear shift regardless of a torque variable may be provided, one thereof may be selected based on the type of gear shift and used as map data which is used to calculate the values of the output variables y(1), y(2), . . . .

The selection process is not limited to the process of selecting one of a plurality of pieces of map data which are different from each other based on at least one of two variables including the torque variable and the type of gear shift. For example, the selection process may be a process of selecting one of a plurality of pieces of map data which are different from each other based on the oil temperature Toil. This can be realized by providing a plurality of pieces of map data which are different from each other based on the oil temperature Toil regardless of the torque variable and the type of gear shift. A plurality of pieces of map data which are different based on at least one of two variables of the torque variable and the type of gear shift and the oil temperature Toil may be provided, and thus one of a plurality of pieces of map data may be selected.

The map data for each area is not limited to data for each of areas in which the hydraulic pressure command value is set to different values. For example, an area in which the hydraulic pressure command value is the same may be partitioned into a plurality of subareas and map data pieces which are different may be provided for the subareas. In this case, since learning has only to be performed such that a map outputs an appropriate value of an output variable in a more limited situation, for example, it is possible to accurately calculate the value of the output variable in a situation in which the number of intermediate layers is small or to accurately calculate the value of the output variable in a situation in which the number of dimensions of the input variables is small.

It is not essential to constitute the map data DM using a plurality of pieces of data for the areas. In other words, it is not essential to perform the selection process. The command values will be described below. In the aforementioned embodiments, the hydraulic pressure command value is determined based on the accelerator operation amount ACCP, the type of gear shift, and the oil temperature Toil, but the disclosure is not limited thereto. For example, the hydraulic pressure command value may be determined for each subarea partitioned based on only two of the three variables. For example, the hydraulic pressure command value may be determined for each subarea partitioned based on only one of the three variables.

It is not essential to correct the hydraulic pressure command value by a learning process. The input variables to a map will be described below. The current difference ΔI is exemplified as a current variable which is an input variable to a map which is defined by the map data DM in the aforementioned embodiments, but the disclosure is not limited thereto. For example, the current I may be used. In this case, for example, when the hydraulic pressure command value is not corrected in the learning process as described above for the command value and a plurality of pieces of map data which differ depending on the accelerator operation amount ACCP, the type of gear shift, and the oil temperature Toil is provided as described above for the selection process, it is possible to accurately calculate the value of the output variable using the current I. When the current I is used, it is not essential that an amount of change of the hydraulic pressure command value in an area in which arbitrary map data is used is small.

In the aforementioned embodiments, the current variable which is an input variable to a map which is defined by the map data DM includes time-series data in a gear shifting period immediately before an abnormality has occurred in addition to the time-series data when the abnormality has occurred, but the disclosure is not limited thereto. For example, the current variable may include time-series data in a past gear shifting period before an abnormality has occurred in addition to time-series data when the abnormality has occurred. For example, the behavior variable may include time-series data in a plurality of gear shifting periods before an abnormality has occurred in addition to time-series data when the abnormality has occurred.

It is not essential that the current variable which is an input variable to the map which is defined by the map data DM includes time-series data in a gear shifting period before an abnormality has occurred. The input variable to the map which is defined by the map data DM may include the correction value ΔP.

The input variable to the map which is defined by the map data DM may include the blow amount ΔNm2. The input variable to the map which is defined by the map data DM may include the oil temperature Toil.

The input variable to the map which is defined by the symptom detection data DPD may include the oil temperature Toil. The map data DM will be described below. The neural network which is defined by the map data DM is not limited to a total-binding forward-propagation type neural network, and may be, for example, a recurrent neural network. The disclosure is not limited to the neural network and, for example, a linear recurrent model may be used.

The symptom detection data DPD will be described below. The neural network which is defined by the symptom detection data DPD is not limited to a total-binding forward-propagation type neural network, and may be, for example, a recurrent neural network. The disclosure is not limited to the neural network and, for example, a linear recurrent model may be used.

The alarm process will be described below. In the aforementioned embodiment, the process of displaying visual information indicating that an abnormality has occurred using the indicator 70 as an alarm device has been described above, but the disclosure is not limited thereto. For example, a process of outputting auditory information indicating that an abnormality has occurred using a speaker as the alarm device may be employed.

The storage process will be described below. In the aforementioned embodiment, the storage device that stores the result of calculation of the output variable is set to the same device as the storage device that stores the map data DM, but the disclosure is not limited thereto.

Even when the values of the output variables y(1), y(2), . . . are calculated in the vehicle VC, it is not essential to perform the storage process. For example, instead of performing the storage process, a process of transmitting the result of calculation to a manufacturer of the vehicle VC, the data analysis center 90, or the like may be performed.

The notification process will be described below. In the aforementioned embodiments, when a symptom of an abnormality is detected, the data analysis center 90 in which big data DB which is data from a plurality of vehicles VC(1), VC(2), . . . is stored is notified thereof, but the disclosure is not limited thereto. For example, when the data analysis center 90 is different from a manufacturer of the vehicles VC(1), VC(2), . . . , the manufacturer may be notified. For example, a dealer of the vehicle VC(1) may be notified.

Applications of the output variable will be described below. (a) Applications of the output variables y(1), y(2), . . . will be described. In the aforementioned embodiments, the values of the output variables y(1), y(2), . . . are used to determine whether to replace a component when a vehicle VC is driven to a repair shop, but the disclosure is not limited thereto. For example, the manufacturer of the vehicle VC may use the values of the output variables as feedback information for improvement of a product.

(b) Applications of the output variables based on current waveforms at the time of performing dither control will be described below. In the aforementioned embodiments, the output variables $z(1)$, $z(2)$, . . . are used to ascertain a symptom of an abnormality, but the disclosure is not limited thereto. For example, by including a full stick in the output variables $z(1)$, $z(2)$, . . . , the process of S30 or the process of S32 may be performed when the maximum value zmax is the same as the value of the output variable corresponding to the full stick. The disclosure is not limited to the processes and, for example, the process of S34 may be performed.

A vehicular control system will be described below. In the third embodiment, the values of the output variables $y(1)$, $y(2)$, . . . and the value of the output variable $z(1)$, $z(2)$, . . . are calculated by the data analysis center 90, but the disclosure is not limited thereto. For example, the values of the output variables $y(1)$, $y(2)$, . . . may be calculated by the data analysis center 90 and the values of the output variables $z(1)$, $z(2)$, . . . may be calculated by the vehicle VC side.

In the aforementioned embodiment, the values of the output variables $y(1)$, $y(2)$, . . . and $z(1)$, $z(2)$, . . . are calculated by the data analysis center 90 for the purpose of updating of the map data DM, but the disclosure is not limited thereto. For example, even when the map data DM is not updated, it is possible to decrease the calculation load of the CPU 42 by causing the outside of the vehicle VC to calculate the values of the output variables $y(1)$, $y(2)$, . . . and $z(1)$, $z(2)$, . . . .

The data based on a detection value from the current sensor which is data transmitted to the data analysis center 90 is not limited to data serving as the input variables $x(1)$, $x(2)$, . . . such as the current difference $\Delta I$. For example, the current I may be employed. In this case, by transmitting the values of the variables required for calculating the current command value I* such as the accelerator operation amount ACCP, the type of gear shift, and the oil temperature Toil to the data analysis center 90, the data analysis center 90 can calculate the current difference $\Delta I$.

The destination to which the vehicle VC transmits the data based on detection values from sensors required for calculating the values of the output variables $y(1)$, $y(2)$ . . . is not limited to the entity that performs the process of calculating the values of the output variables $y(1)$, $y(2)$, . . . . For example, a data center that stores the big data DB and an analysis center that calculates the values of the output variables $y(1)$, $y(2)$, . . . may be separately provided and data based on the detection values of the sensors may be transmitted from the vehicle VC to the data center. In this case, the data center can transmit the received data and the like to the analysis center.

The destination to which the vehicle VC transmits the data based on detection values from sensors required for calculating the values of the output variables $y(1)$, $y(2)$, . . . is not limited to the entity that handles data from a plurality of vehicles VC(1), VC(2), . . . . For example, the destination may be a mobile terminal of a user of the vehicle VC.

The destination to which the vehicle VC transmits the data based on detection values from sensors required for calculating the value of the output variables $z(1)$, $z(2)$, . . . is not limited to the entity that handles data from a plurality of vehicles VC(1), VC(2), . . . . For example, the destination may be a mobile terminal of a user of the vehicle VC.

An execution device will be described below. The execution device is not limited to an execution device including the CPU 42 (92) and the ROM 44 (94) and performing software processes. For example, a dedicated hardware circuit such as an ASIC that performs at least a part of the software processes performed in the aforementioned embodiments in hardware may be provided. That is, the execution device may have at least one of the following configurations (a) to (c). (a) A processor that performs all the processes in accordance with a program and a program storage device such as a ROM that stores the program are provided. (b) A processor that performs some of the processes in accordance with a program, a program storage device, and a dedicated hardware circuit that performs the other processes are provided. (c) A dedicated hardware circuit that performs all the processes is provided. Here, the number of software processing circuits including a processor and a program storage device or the number of dedicated hardware circuits may be two or more.

An electromagnetic actuator will be described below. The electromagnetic actuator 28 is not limited to the electromagnetic actuator 28 of the gear shifting device 26. An onboard electromagnetic actuator other than the gear shifting device 26 can effectively use the map to identify details of a position of an abnormality.

A vehicle will be described below. The vehicle is not limited to a series/parallel hybrid vehicle. For example, the vehicle may be a series hybrid vehicle or a parallel hybrid vehicle. The onboard rotary machine is not limited to a rotary machine including an internal combustion engine and a motor/generator. For example, a vehicle including an internal combustion engine but not including a motor/generator may be employed or, for example, a vehicle including a motor/generator but not including an internal combustion engine may be employed.

What is claimed is:

1. An abnormality cause determining device that is applied to a vehicle including an electromagnetic actuator, comprising:
a storage device configured to store map data which is data for defining a map, the map including a current variable which is a variable indicating a current actually flowing in the electromagnetic actuator as an input variable and including a cause variable which is a variable indicating a cause of an abnormality of an onboard unit including the electromagnetic actuator as an output variable; and
an execution device configured to perform an acquisition process of acquiring a value of the input variable based on a detection value from a sensor which is mounted in the vehicle and a calculation process of calculating a value of the output variable by inputting the value of the input variable to the map, wherein
the onboard unit is a gear shifting device that changes a gear shift ratio between a rotation speed of a rotation shaft of a rotary machine which is mounted in the vehicle and a rotation speed of driving wheels,
the electromagnetic actuator includes a solenoid valve of the gear shifting device, and
the current variable which is the input variable includes a variable indicating a current flowing in the solenoid valve in a switching period of the gear shift ratio in the gear shifting device, wherein
the storage device is configured to store a plurality of pieces of map data which differs depending on a switching type of the gear shift ratio, and
the calculation process includes a selection process of selecting the map data corresponding to switching of the gear shift ratio in a sampling period of the current variable which is the input variable out of the plurality of pieces of map data as the map data defining the map for calculating the value of the output variable.

2. The abnormality cause determining device according to claim 1, wherein the current variable includes a variable indicating a difference between the detection value of the current flowing in the solenoid valve in the switching period and a current command value.

3. The abnormality cause determining device according to claim 1, wherein:
- the storage device is configured to store a plurality of pieces of map data which differs depending on a torque variable which is a variable indicating a torque applied to the driving wheels;
- the acquisition process includes a process of acquiring a value of the torque variable; and
- the calculation process includes a selection process of selecting the map data corresponding to the value of the torque variable acquired through the acquisition process out of the plurality of pieces of map data as the map data defining the map for calculating the value of the output variable.

4. The abnormality cause determining device according to claim 1, wherein the current variable which is the input variable simultaneously input to the map includes a variable indicating a current having flowed in the solenoid valve when the same switch was performed in the past in addition to the variable indicating the current flowing in the solenoid valve in a present switching period of the gear shift ratio in the gear shifting device.

5. The abnormality cause determining device according to claim 1, wherein the cause variable includes a decrease in controllability of the solenoid valve due to bubbles included in a hydraulic fluid of the gear shifting device, a temporary stick abnormality which is an abnormality temporarily occurring in an operation of the solenoid valve due to temporary mixing of foreign matter into the solenoid valve, and a regular stick abnormality which is an abnormality occurring regularly in the operation of the solenoid valve due to mixing of foreign matter into the solenoid valve.

6. A vehicular control device comprising the abnormality cause determining device according to claim 1, wherein:
the execution device is configured to perform
an abnormality determining process of determining that an abnormality has occurred in the gear shifting device when a degree of separation between a rotation speed of an input shaft of the gear shifting device in a period in which the gear shift ratio is switched and a reference rotation speed is equal to or greater than a predetermined value, and
an alarming process of issuing an alarm indicating that the abnormality has occurred; and
the acquisition process includes a process of acquiring the value of the input variable in the period in which the gear shift ratio is switched when it is determined through the abnormality determining process that the abnormality has occurred.

7. The vehicular control device according to claim 6, wherein the execution device is configured to perform a storage process of storing a calculation result of the calculation process in the storage device.

8. A vehicular control system comprising the vehicular control device according to claim 6, wherein:
- the execution device includes a first execution device that is provided in the vehicle and a second execution device that is not provided in the vehicle;
- the first execution device is configured to perform a data transmission process of transmitting data based on a detection value from the sensor associated with a current flowing actually in the electromagnetic actuator; and
- the second execution device is configured to perform a data receiving process of receiving data transmitted in the data transmission process and the calculation process.

9. The vehicular control system according to claim 8, wherein:
- the second execution device is configured to perform the calculation process based on values of current variables of a plurality of vehicles; and
- the second execution device is configured to perform a feedback process and an update process, the feedback process is a process of acquiring information indicating that the value of the output variable of the calculation process is not valid, and the update process is a process of updating the map data when the information indicating that the value of the output variable is not valid is acquired in the feedback process.

10. The vehicular control system according to claim 8, wherein:
- the second execution device is configured to perform a result transmitting process of transmitting a calculation result of the calculation process; and
- the first execution device is configured to perform a result receiving process of receiving the calculation result transmitted in the result transmitting process.

11. A vehicular control device comprising the first execution device in the vehicular control system according to claim 8.

12. A vehicular control device comprising the abnormality cause determining device according to claim 1, wherein:
- the map is a first map;
- the map data is first map data;
- the acquisition process is a first acquisition process;
- the calculation process is a first calculation process;
- the execution device is configured to perform a dither control process of causing a current to flow in the solenoid valve such that the solenoid valve for switching a frictional engagement element which is disengaged when the gear shift ratio is not switching between disengagement and engagement vibrates in a range in which the frictional engagement element is not engaged;
- the storage device is configured to store second map data for defining a second map including the current variable when the dither control process is performed as an input variable and including an abnormality variable which is a variable indicating whether an abnormality has occurred in the solenoid valve as an output variable; and
- the execution device is configured to perform
  a second acquisition process of acquiring a value of the current variable when the dither control process is performed, and
  a second calculation process calculating a value of the output variable by inputting the value of the current variable acquired in the second acquisition process to the second map.

13. The vehicular control device according to claim 12, wherein the execution device is configured to perform a notification process of notifying a calculation result of the second calculation process to an outside of the vehicle.

14. A vehicular control system comprising the vehicular control device according to claim 12, wherein:
the execution device includes a first execution device that is provided in the vehicle and a second execution device that is not provided in the vehicle;

the first execution device is configured to perform a data transmission process of transmitting data based on a detection value from the sensor associated with a current flowing actually in the electromagnetic actuator; and the second execution device is configured to perform a data receiving process of receiving data transmitted in the data transmission process and the calculation process.

15. The vehicular control system according to claim 14, wherein:
the second execution device is configured to perform the calculation process based on values of current variables of a plurality of vehicles; and the second execution device is configured to perform a feedback process and an update process, the feedback process is a process of acquiring information indicating that the value of the output variable of the calculation process is not valid, and the update process is a process of updating the map data when the information indicating that the value of the output variable is not valid is acquired in the feedback process.

16. The vehicular control system according to claim 14, wherein:
the second execution device is configured to perform a result transmitting process of transmitting a calculation result of the calculation process; and the first execution device is configured to perform a result receiving process of receiving the calculation result transmitted in the result transmitting process.

17. A vehicular control device comprising the first execution device in the vehicular control system according to claim 16.

18. An abnormality cause determining device that is applied to a vehicle including an electromagnetic actuator, comprising:
a storage device configured to store map data which is data for defining a map, the map including a current variable which is a variable indicating a current actually flowing in the electromagnetic actuator as an input variable and including a cause variable which is a variable indicating a cause of an abnormality of an onboard unit including the electromagnetic actuator as an output variable; and an execution device configured to perform an acquisition process of acquiring a value of the input variable based on a detection value from a sensor which is mounted in the vehicle and a calculation process of calculating a value of the output variable by inputting the value of the input variable to the map, wherein the onboard unit is a gear shifting device that changes a gear shift ratio between a rotation speed of a rotation shaft of a rotary machine which is mounted in the vehicle and a rotation speed of driving wheels, the electromagnetic actuator includes a solenoid valve of the gear shifting device, and the current variable which is the input variable includes a variable indicating a current flowing in the solenoid valve in a switching period of the gear shift ratio in the gear shifting device, wherein the storage device is configured to store a plurality of pieces of map data which differs depending on a torque variable which is a variable indicating a torque applied to the driving wheels, the acquisition process includes a process of acquiring a value of the torque variable, and the calculation process includes a selection process of selecting the map data corresponding to the value of the torque variable acquired through the acquisition process out of the plurality of pieces of map data as the map data defining the map for calculating the value of the output variable.

19. A vehicular control device comprising the abnormality cause determining device according to claim 18, wherein:
the execution device is configured to perform
an abnormality determining process of determining that an abnormality has occurred in the gear shifting device when a degree of separation between a rotation speed of an input shaft of the gear shifting device in a period in which the gear shift ratio is switched and a reference rotation speed is equal to or greater than a predetermined value, and
an alarming process of issuing an alarm indicating that the abnormality has occurred; and
the acquisition process includes a process of acquiring the value of the input variable in the period in which the gear shift ratio is switched when it is determined through the abnormality determining process that the abnormality has occurred.

20. A vehicular control device comprising the abnormality cause determining device according to claim 18, wherein:
the map is a first map;
the map data is first map data;
the acquisition process is a first acquisition process;
the calculation process is a first calculation process;
the execution device is configured to perform a dither control process of causing a current to flow in the solenoid valve such that the solenoid valve for switching a frictional engagement element which is disengaged when the gear shift ratio is not switching between disengagement and engagement vibrates in a range in which the frictional engagement element is not engaged;
the storage device is configured to store second map data for defining a second map including the current variable when the dither control process is performed as an input variable and including an abnormality variable which is a variable indicating whether an abnormality has occurred in the solenoid valve as an output variable; and
the execution device is configured to perform
a second acquisition process of acquiring a value of the current variable when the dither control process is performed, and
a second calculation process calculating a value of the output variable by inputting the value of the current variable acquired in the second acquisition process to the second map.

* * * * *